United States Patent
Kosaka et al.

(10) Patent No.: US 10,131,406 B2
(45) Date of Patent: Nov. 20, 2018

(54) BICYCLE OPERATING DEVICE

(71) Applicant: SHIMANO INC., Sakai (JP)

(72) Inventors: Kentaro Kosaka, Sakai (JP); Yoshimitsu Miki, Sakai (JP); Kazunori Okubo, Sakai (JP)

(73) Assignee: SHIMANO INC., Sakai (JP)

( * ) Notice: Subject to any disclaimer, the term of this patent is extended or adjusted under 35 U.S.C. 154(b) by 102 days.

(21) Appl. No.: 14/850,890

(22) Filed: Sep. 10, 2015

(65) Prior Publication Data

US 2017/0073034 A1 Mar. 16, 2017

(51) Int. Cl.
*B62M 25/04* (2006.01)
*B62L 3/02* (2006.01)
*B62K 23/06* (2006.01)

(52) U.S. Cl.
CPC .............. *B62M 25/04* (2013.01); *B62K 23/06* (2013.01); *B62L 3/02* (2013.01)

(58) Field of Classification Search
CPC ....... B62M 25/04; B62M 25/02; B62K 23/06; B62K 23/02; B62L 3/026; B62L 3/02; B60T 7/102; B60T 11/046; G05G 1/04; G05G 1/06; Y10T 74/20822; Y10T 74/20402; Y10T 74/20396; Y10T 74/2028; Y10T 74/20287; Y10T 74/20438
See application file for complete search history.

(56) References Cited

U.S. PATENT DOCUMENTS

| | | | |
|---|---|---|---|
| 2006/0207375 A1* | 9/2006 | Jordan | B62M 25/04 74/489 |
| 2007/0068312 A1* | 3/2007 | Sato | B62K 23/06 74/502.2 |
| 2008/0295638 A1* | 12/2008 | Miki | B62K 23/06 74/502.2 |
| 2012/0297912 A1* | 11/2012 | Emura | B62M 25/04 74/473.14 |
| 2012/0297919 A1* | 11/2012 | Fukao | B62K 23/06 74/502.2 |
| 2012/0318094 A1* | 12/2012 | Fukao | B62K 23/06 74/502.2 |

\* cited by examiner

*Primary Examiner* — Daniel D Yabut
(74) *Attorney, Agent, or Firm* — Mori & Ward, LLP

(57) ABSTRACT

A bicycle operating device comprises a base member, a cable control body, a positioning pawl, a stopping member, and a stopping pawl. The positioning pawl is movable between a holding position to stop a movement of the cable control body in a first direction, and a non-holding position to allow a movement of the cable control body in the first direction. The stopping pawl is movable between a stopping position to stop a movement of the stopping member in the first direction, and a non-stopping position to allow a movement of the stopping member in the first direction. The stopping member is coupled to the cable control body such that the cable control body is movable relative to the stopping member within a movable range while the stopping pawl is arranged at the stopping position.

24 Claims, 25 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a base member, a cable control body, a positioning pawl, a stopping member, and a stopping pawl. The cable control body is movable relative to the base member in a first direction and a second direction that is different from the first direction. The cable control body includes a positioning part. The positioning pawl is configured to engage with the positioning part. The positioning pawl is movable between a holding position to stop a movement of the cable control body in the first direction, and a non-holding position to allow a movement of the cable control body in the first direction. The stopping member is movable relative to the base member and the cable control body in the first direction and the second direction. The stopping pawl is configured to engage with the stopping member. The stopping pawl is movable between a stopping position to stop a movement of the stopping member in the first direction, and a non-stopping position to allow a movement of the stopping member in the first direction. The stopping member is coupled to the cable control body such that the cable control body is movable relative to the stopping member within a movable range while the stopping pawl is arranged at the stopping position.

With the bicycle operating device in accordance with the first aspect, the stopping member is coupled to the cable control body such that the cable control body is movable relative to the stopping member within the movable range while the stopping pawl is arranged at the stopping position. This allows the cable control body to approach or reach a target position by using the movable range with restricting excess movement of the cable control body relative to the stopping member. Accordingly, it is possible to improve a response speed of the bicycle operating device.

In accordance with a second aspect of the present invention, the bicycle operating device according to the first aspect further comprises a biasing member configured to bias the stopping member relative to the cable control body in the first direction.

With the bicycle operating device in accordance with the second aspect, it is possible to position the stopping member relative to the cable control body at an end position of the movable range by using a biasing force of the biasing member.

In accordance with a third aspect of the present invention, the bicycle operating device according to the second aspect is configured so that the second direction is opposite to the first direction. The cable control body includes a cable attachment part to which a control cable is attached. The cable control body is configured to release the control cable when the cable control body is moved in the first direction. The cable control body is configured to pull the control cable when the cable control body is moved in the second direction.

With the bicycle operating device in accordance with the third aspect, it is possible to move the control cable in the first direction by a length corresponding to the movable range while the stopping pawl is arranged at the stopping position. This allows the control cable to approach or reach a target position by using the movable range with restricting excess movement of the cable control body relative to the stopping member.

In accordance with a fourth aspect of the present invention, the bicycle operating device according to any one of the first to third aspects is configured so that the cable control body is rotatable relative to the base member about a main axis.

In accordance with a fifth aspect of the present invention, the bicycle operating device according to the fourth aspect is configured so that the stopping member is rotatable relative to the cable control body about the main axis within the movable range.

In accordance with a sixth aspect of the present invention, the bicycle operating device according to the fifth aspect is configured so that the stopping member is mounted on the cable control body.

With the bicycle operating device in accordance with the sixth aspect, it is possible to make the bicycle operating device compact.

In accordance with a seventh aspect of the present invention, the bicycle operating device according to any one of the first to sixth aspects is configured so that the positioning pawl is pivotable relative to the base member about a first pivot axis between the holding position and the non-holding position. The stopping pawl is pivotable relative to the base member about a second pivot axis between the stopping position and the non-stopping position.

In accordance with an eighth aspect of the present invention, the bicycle operating device according to the seventh aspect is configured so that the second pivot axis coincides with the first pivot axis.

With the bicycle operating device in accordance with the eighth aspect, it is possible to simplify a structure to pivotally support the positioning pawl and the stopping pawl.

In accordance with a ninth aspect of the present invention, the bicycle operating device according to the seventh aspect is configured so that the second pivot axis is spaced apart from the first pivot axis.

With the bicycle operating device in accordance with the ninth aspect, it is possible to arrange the first pivot axis and the second pivot axis at different positions, improving degree of freedom of designing the bicycle operating device.

In accordance with a tenth aspect of the present invention, the bicycle operating device according to any one of the first to ninth aspects is configured so that the stopping member is movably mounted on the cable control body within the movable range.

In accordance with an eleventh aspect of the present invention, the bicycle operating device according to the tenth aspect further comprises a restricting structure configured to restrict a relative movement between the cable control body and the stopping member within the movable range.

In accordance with a twelfth aspect of the present invention, the bicycle operating device according to the eleventh aspect is configured so that the restricting structure includes a protrusion and a recess. The protrusion is provided at one of the cable control body and the stopping member. The recess is provided at the other of the cable control body and the stopping member. The recess is dimensioned such that the protrusion is movable within the movable range in the first direction and the second direction.

With the bicycle operating device in accordance with the twelfth aspect, it is possible to restrict the relative movement between the cable control body and the stopping member within the movable range with a simple structure.

In accordance with a thirteenth aspect of the present invention, the bicycle operating device according to the twelfth aspect further comprises a biasing member arranged between the protrusion and the recess so as to bias the stopping member relative to the cable control body in the first direction.

With the bicycle operating device in accordance with the thirteenth aspect, it is possible to position the stopping member relative to the cable control body at an end position of the movable range with the simple structure including the biasing member.

In accordance with a fourteenth aspect of the present invention, the bicycle operating device according to any one of the fifth to thirteenth aspects further comprises a first operating member and a control member. The first operating member is pivotable relative to the base member about a first operating axis in a first operating direction. The control member is rotatable about the main axis in the second direction in response to a movement of the first operating member in the first operating direction such that the control member moves the positioning pawl from the holding position toward the non-holding position and moves the stopping pawl from the non-stopping position toward the stopping position.

With the bicycle operating device in accordance with the fourteenth aspect, it is possible to move the positioning pawl and the stopping pawl via the first operating member.

In accordance with a fifteenth aspect of the present invention, the bicycle operating device according to the fourteenth aspect further comprises a second operating member and a transmitting structure. The second operating member is pivotable relative to the base member about a second operating axis in a second operating direction. The transmitting structure is configured to transmit a pivotal movement of the second operating member in the second operating direction to the cable control body such that the cable control body is rotated in the second direction.

With the bicycle operating device in accordance with the fifteenth aspect, it is possible to rotate the cable control body in the second direction via the second operating member.

In accordance with a sixteenth aspect of the present invention, the bicycle operating device according to the fourteenth or fifteenth aspect is configured so that the positioning part includes positioning teeth configured to engage with the positioning pawl.

In accordance with a seventeenth aspect of the present invention, the bicycle operating device according to the sixteenth aspect is configured so that the positioning part has an outer periphery. The positioning teeth are provided on an outer periphery of the positioning part.

In accordance with an eighteenth aspect of the present invention, the bicycle operating device according to any one of the fifth to seventeenth aspects is configured so that the stopping member includes stopping teeth configured to engage with the stopping pawl.

In accordance with a nineteenth aspect of the present invention, the bicycle operating device according to the eighteenth aspect is configured so that the stopping member has an outer periphery. The stopping teeth are provided on an outer periphery of the stopping member.

In accordance with a twentieth aspect of the present invention, the bicycle operating device according to any one of the first to nineteenth aspects is configured so that the cable control body includes a pulling part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
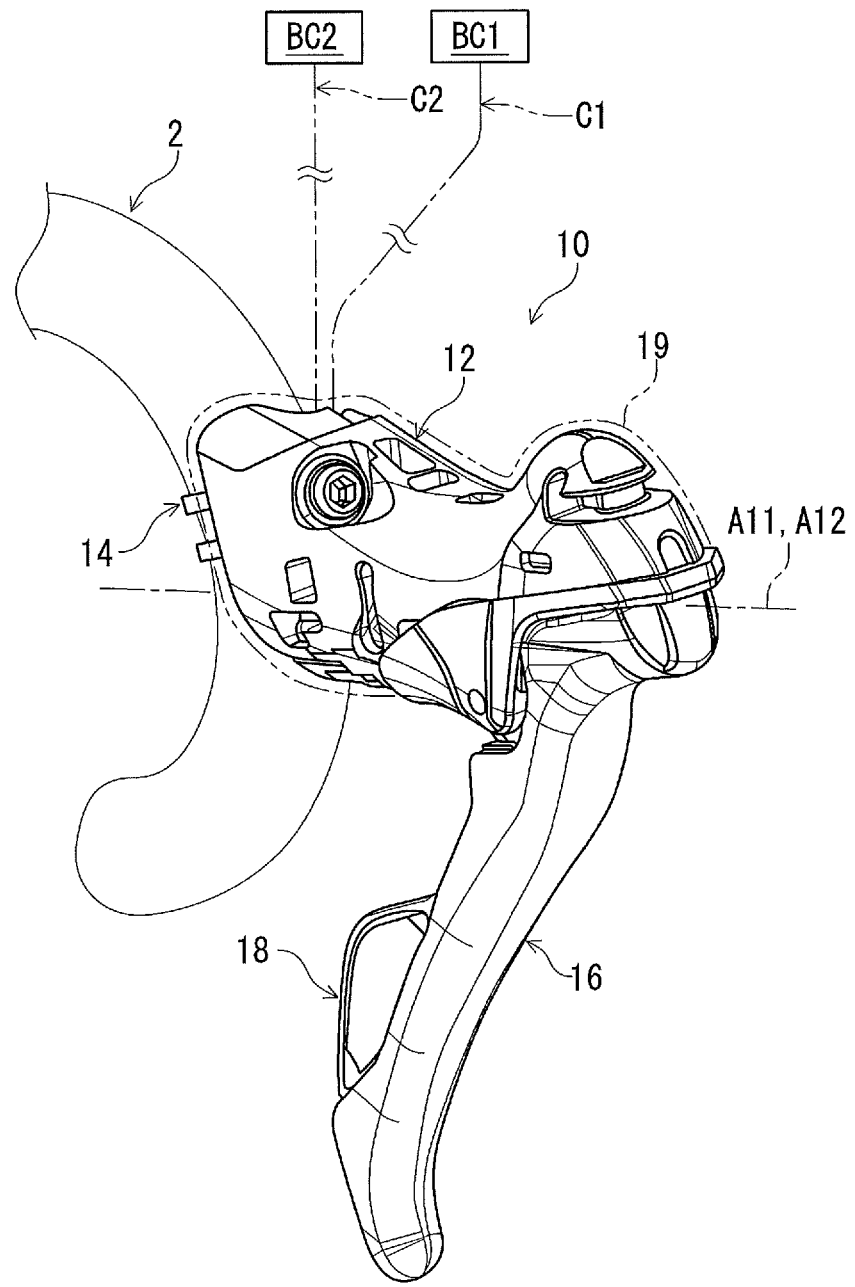
FIG. 1 is a perspective view of a bicycle operating device in accordance with a first embodiment, with a handlebar.

The embodiments will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a handlebar 2. In the illustrated embodiment, the bicycle operating device 10 is configured to be mounted to a drop-down handlebar. However, structures of the bicycle operating device 10 can be applied to other operating devices mounted to other type of handlebars such as a flat handlebar, a time trial handlebar, and a bull horn handlebar.

The bicycle operating device 10 is configured to be operated by a user (e.g., a rider) to actuate a bicycle component BC1 and an additional bicycle component BC2. Examples of the bicycle component BC1 include a gear shifting device such as a derailleur. Examples of the additional bicycle component BC2 include a brake device. In this embodiment, the bicycle operating device 10 is a right hand side control device configured to be operated by the rider's right hand to actuate the bicycle component BC1. However, the structure of the bicycle operating device 10 can be applied to a left hand side control device.

In the present application, the following directional terms "front", "rear", "forward", "rearward", "left", "right", "transverse", "upward" and "downward" as well as any other similar directional terms refer to those directions which are determined on the basis of the user (e.g., the rider) who sits on a saddle (not shown) of a bicycle with facing the handlebar 2. Accordingly, these terms, as utilized to describe the bicycle operating device 10, should be interpreted relative to the bicycle equipped with the bicycle operating device 10 as used in an upright riding position on a horizontal surface.

The bicycle operating device 10 is operatively coupled to the bicycle component BC1 via a control cable C1 such as a Bowden cable. The bicycle operating device 10 is operatively coupled to the additional bicycle component BC2 via an additional control cable C2 such as the Bowden cable. However, the bicycle operating device 10 can be operatively coupled to the additional bicycle component BC2 via another cable such as an electrical control cable or a hydraulic control cable. Furthermore, the additional bicycle component BC2 and the additional control cable C2 can be omitted.

As seen in FIG. 1, the bicycle operating device 10 comprises a base member 12, a mounting structure 14, a first operating member 16, and a second operating member 18. The base member 12 is mounted to the handlebar 2 via the mounting structure 14. The base member 12 is a stationary member when mounted to the handlebar 2. The mounting structure 14 preferably includes a band clamp or similar structure that is used in a road shifter for mounting to a drop-down handlebar. The base member 12 is covered by a grip cover 19 made of a non-metallic material such as rubber. Riders sometimes grip the base member 12 and lean on the base member 12 during riding.

Figure 2:
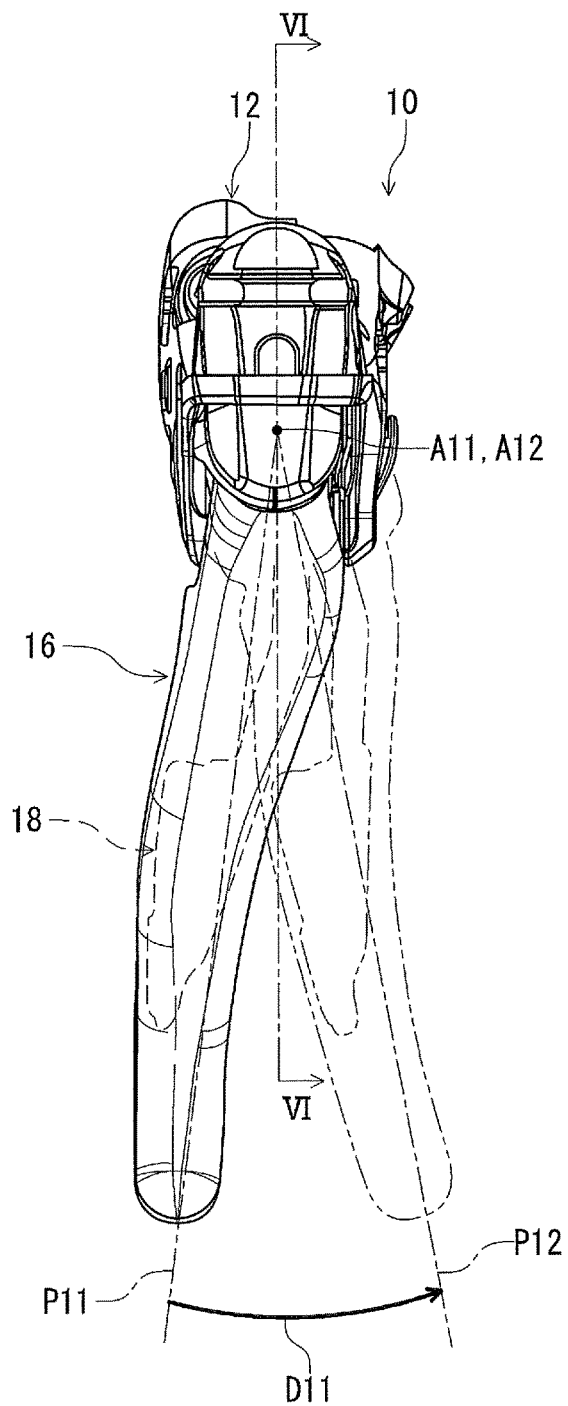
FIG. 2 is a front view of the bicycle operating device illustrated in FIG. 1.

As seen in FIG. 2, the first operating member 16 is pivotable relative to the base member 12 about a first operating axis A11 in a first operating direction D11. In this embodiment, the first operating member 16 is pivotable relative to the base member 12 about the first operating axis A11 in the first operating direction D11 from a first rest position P11 to a first operated position P12. The first operating member 16 functions as a cable pulling (winding) lever.

The second operating member 18 is pivoted together with the first operating member 16 relative to the base member 12 about the second operating axis A12 in the second operating direction D12 when the first operating member 16 is pivoted by the rider relative to the base member 12 in the first operating direction D11 from the first rest position P11 to the first operated position P12.

Figure 3:
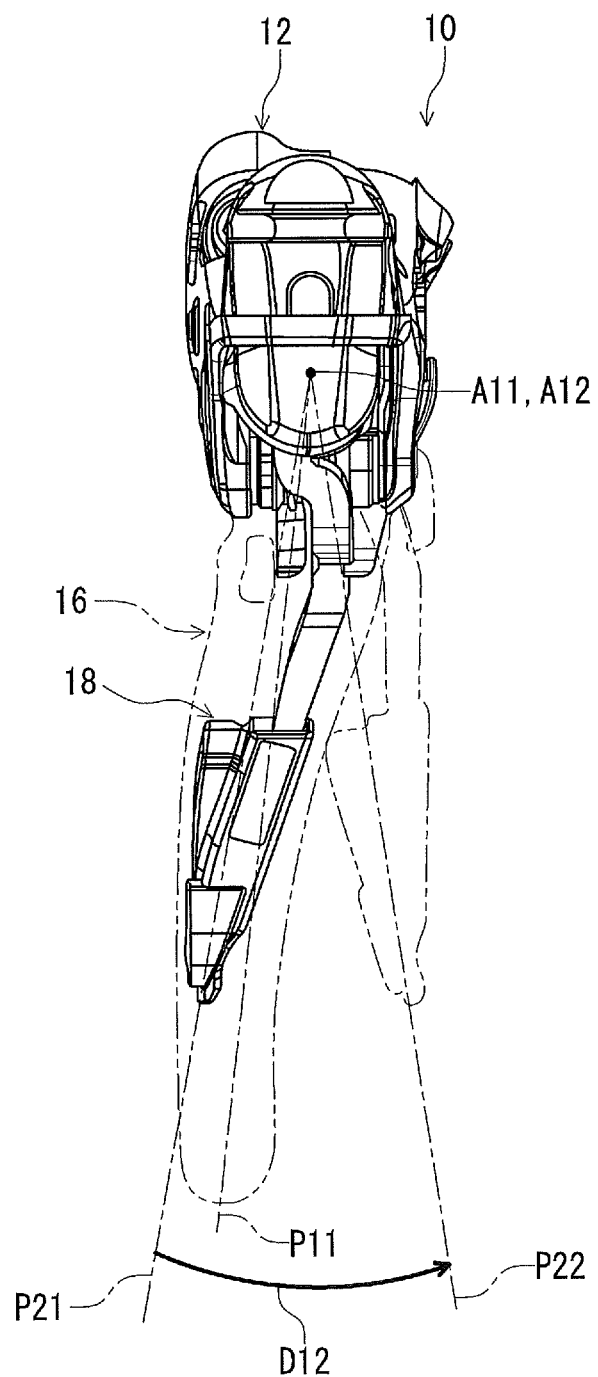
FIG. 3 is a front view of the bicycle operating device illustrated in FIG. 1.

As seen in FIG. 3, the second operating member 18 is pivotable relative to the base member 12 about a second operating axis A12 in a second operating direction D12. In this embodiment, the second operating member 18 is pivotable relative to the base member 12 about the second operating axis A12 in the second operating direction D12 from a second rest position P21 to a second operated position P22. The second operating member 18 functions as a cable releasing lever.

The second operating member 18 is pivoted relative to the base member 12 about the second operating axis A12 in the second operating direction D12 without moving the first operating member 16 when the second operating member 18 is pivoted by the rider relative to the base member 12 in the second operating direction D12 from the second rest position P21 to the second operated position P22.

In the present application, the term "rest position" as used herein refers to a position at which a movable part such as the first operating member 16 or the second operating member 18 remains stationary in a state where the movable part is not operated by the user. The term "operated position" as used herein refers to a position at which the movable part has been operated by the user to perform the operation of a bicycle component such as the bicycle component BC1 or the additional bicycle component BC2.

In this embodiment, as seen in FIGS. 2 and 3, the second operating axis A12 coincides with the first operating axis A11. The second operating direction D12 coincides with the first operating direction D11. However, the second operating axis A12 can be offset from the first operating axis A11, and the second operating direction D12 can be different from the first operating direction D11.

Figure 4:
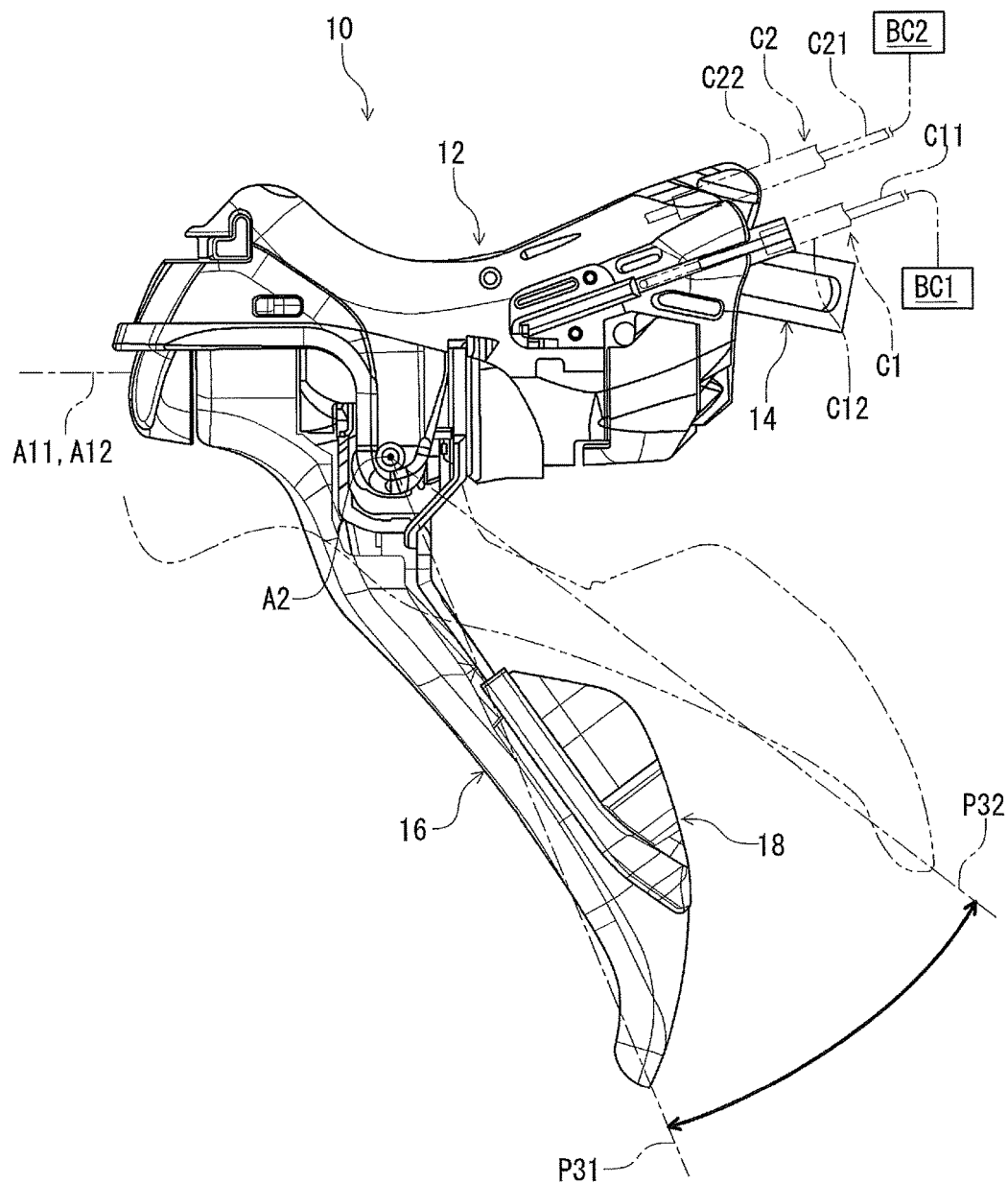
FIG. 4 is a side elevational view of the bicycle operating device illustrated in FIG. 1.

As seen in FIG. 4, the first operating member 16 is pivotable relative to the base member 12 about a brake pivot axis A2 between a third rest position P31 and a third operated position P32. The second operating member 18 is pivotable relative to the base member 12 about the brake pivot axis A2. The brake pivot axis A2 is different from the first operating axis A11 and the second operating axis A12. The second operating member 18 is pivoted together with the first operating member 16 relative to the base member 12 about the brake pivot axis A2 when the first operating member 16 is pivoted by the rider relative to the base member 12 between the third rest position P31 and the third operated position P32. In this embodiment, the first operating member 16 also functions as a brake lever.

The control cable C1 includes an inner wire C11 and an outer case C12. The outer case C12 has a tubular shape. The inner wire C11 is slidably provided in the outer case C12. The base member 12 receives an end of the outer case C12. The additional control cable C2 includes an inner wire C21 and an outer case C22. The outer case C22 has a tubular shape. The inner wire C21 is slidably provided in the outer case C22. The base member 12 receives an end of the outer case C22.

Figure 5:
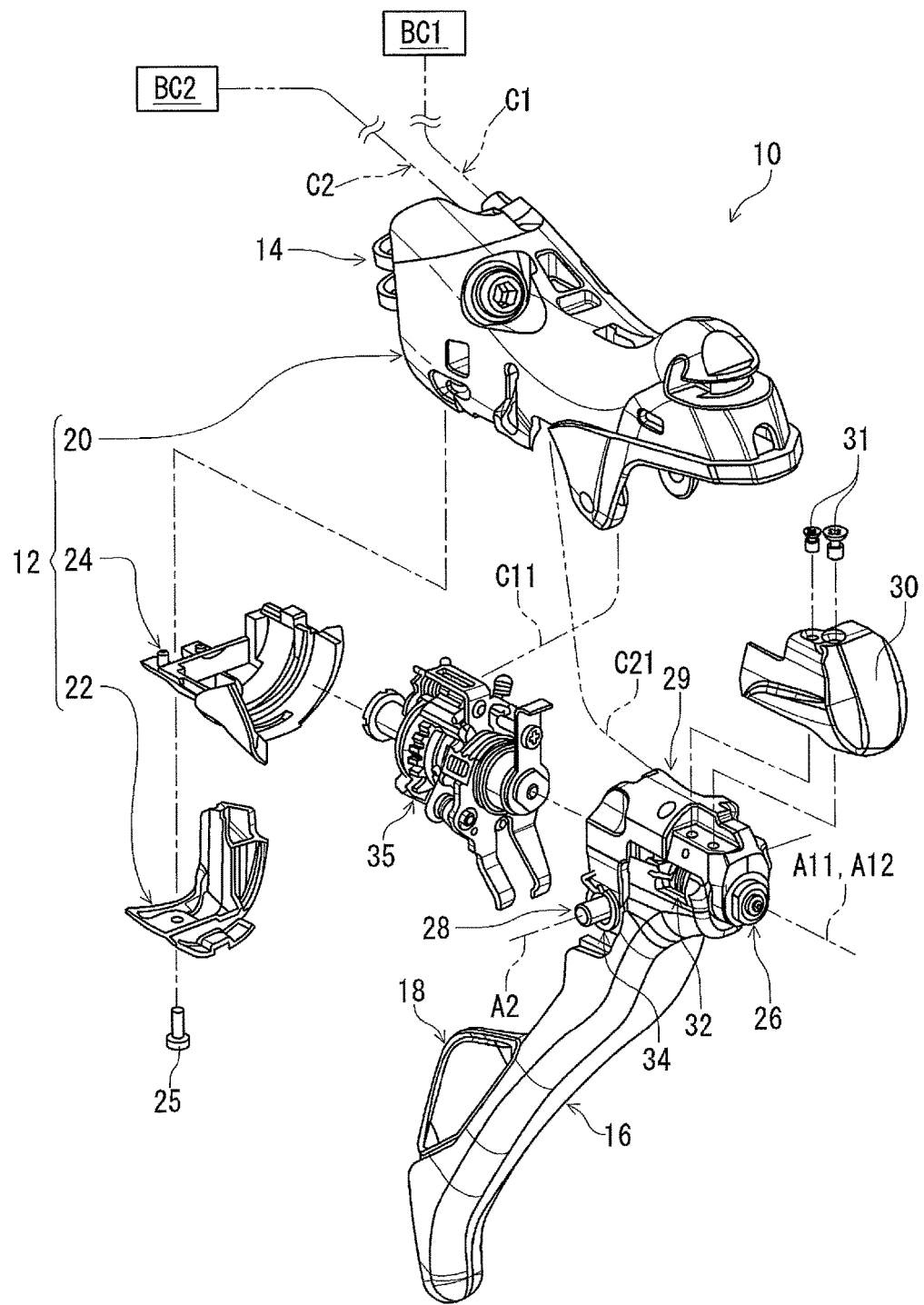
FIG. 5 is an exploded perspective view of the bicycle operating device illustrated in FIG. 1.

As seen in FIG. 5, the base member 12 includes a first base part 20, a second base part 22, and a third base part 24. The first base part 20 is configured to be secured to the handlebar 2 (FIG. 1) via the mounting structure 14. The second base part 22 is fastened to the first base part 20 with a fastener 25. The third base part 24 is held between the first base part 20 and the second base part 22.

Figure 6:
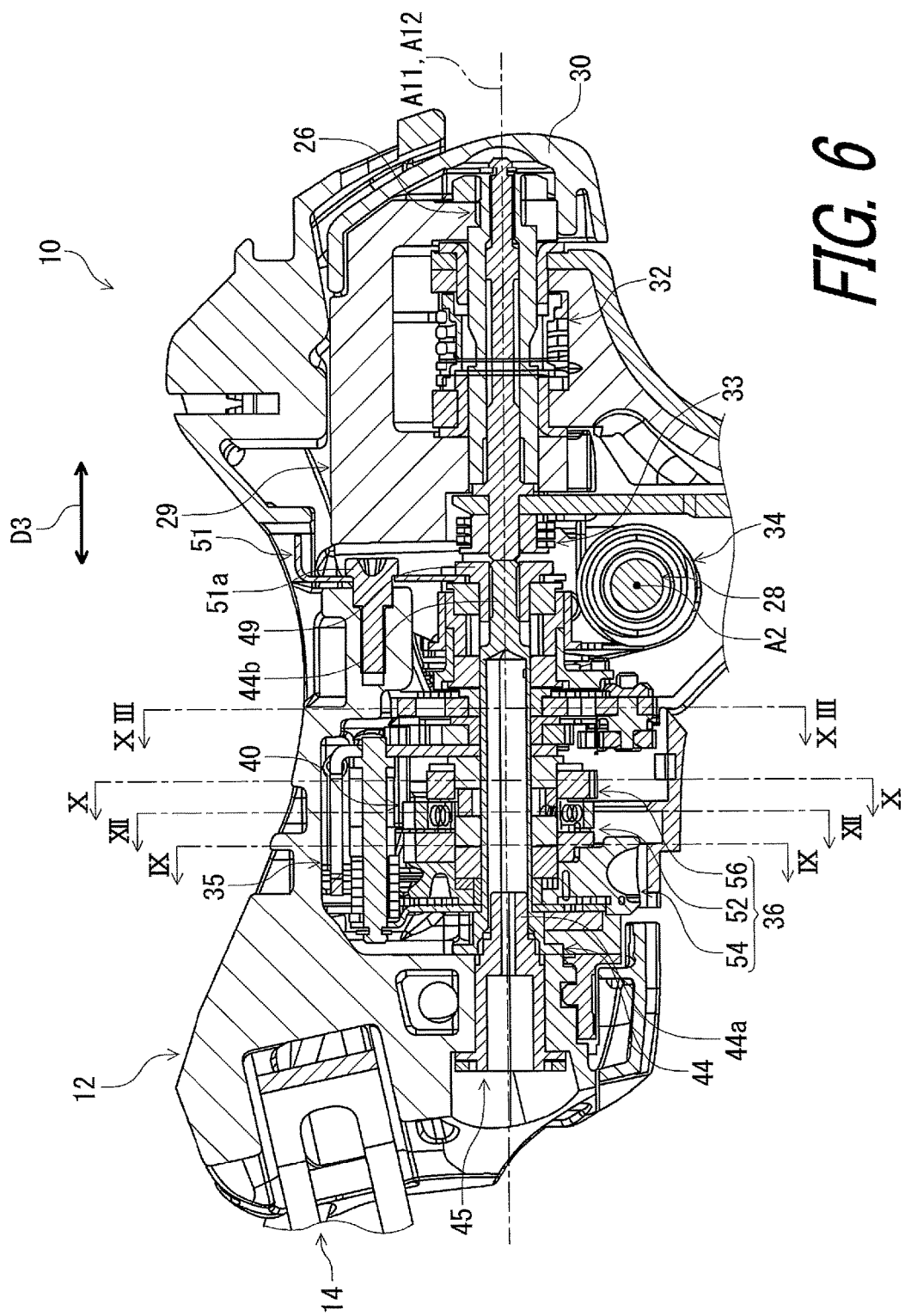
FIG. 6 is a partial cross-sectional view of the bicycle operating device taken along line VI-VI of FIG. 2.

As seen in FIGS. 5 and 6, the bicycle operating device 10 includes a shift pivot shaft 26, a brake pivot shaft 28, a supporting member 29, and a front cover 30. The shift pivot shaft 26 defines the first operating axis A11 and the second operating axis A12. The brake pivot shaft 28 defines the brake pivot axis A2. Each of the first operating member 16 and the second operating member 18 is pivotally mounted to the supporting member 29 via the shift pivot shaft 26. The first operating member 16 is pivotable relative to the supporting member 29 about the first operating axis A11. The second operating member 18 is pivotable relative to the supporting member 29 about the second operating axis A12.

As seen in FIG. 5, the supporting member 29 is pivotally mounted to the base member 12 via the brake pivot shaft 28. The inner wire C21 of the additional control cable C2 is coupled to the supporting member 29 to operate the additional bicycle component BC2. The front cover 30 is fastened to the supporting member 29 with fasteners 31. The first operating member 16 and the second operating member 18 are pivotally mounted to the base member 12 about the brake pivot axis A2 via the supporting member 29 and the brake pivot shaft 28.

As seen in FIG. 6, the bicycle operating device 10 includes a brake biasing element 34, a first shift biasing element 32, and a second shift biasing element 33. The first shift biasing element 32 is configured to bias the first operating member 16 toward the first rest position P11 (FIG. 2). The second shift biasing element 33 is configured to bias the second operating member 18 toward the second rest position P21 (FIG. 3). The brake biasing element 34 is configured to bias the first operating member 16 via the supporting member 29 toward the third rest position P31 (FIG. 4). The first shift biasing element 32 and the second shift biasing element 33 are mounted on the shift pivot shaft 26. The brake biasing element 34 is mounted on the brake pivot shaft 28. For example, each of the first shift biasing element 32, the second shift biasing element 33, and the brake biasing element 34 is a torsion spring.

Figure 7:
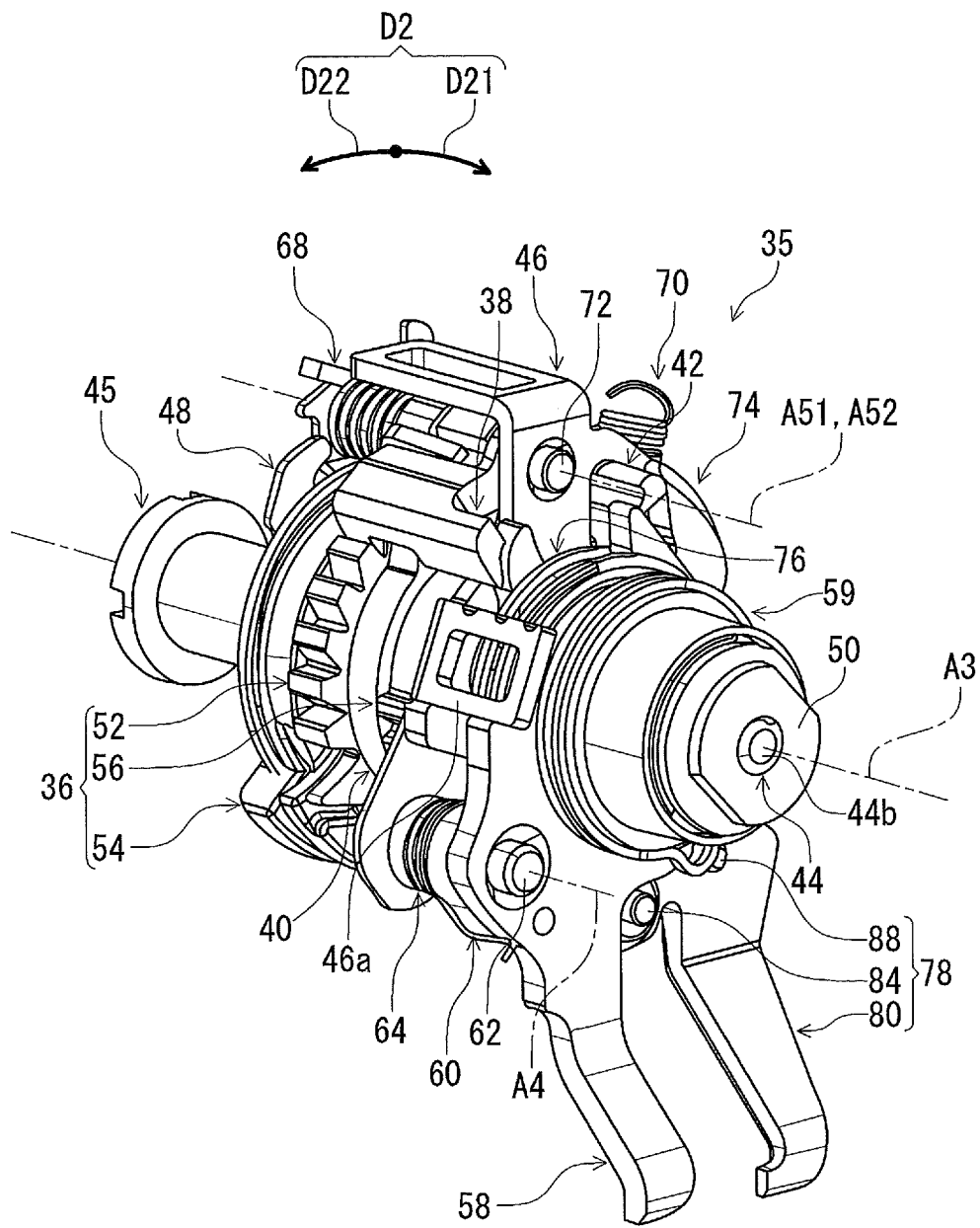
FIG. 7 is a perspective view of a shift operating unit of the bicycle operating device illustrated in FIG. 1.
Figure 8:
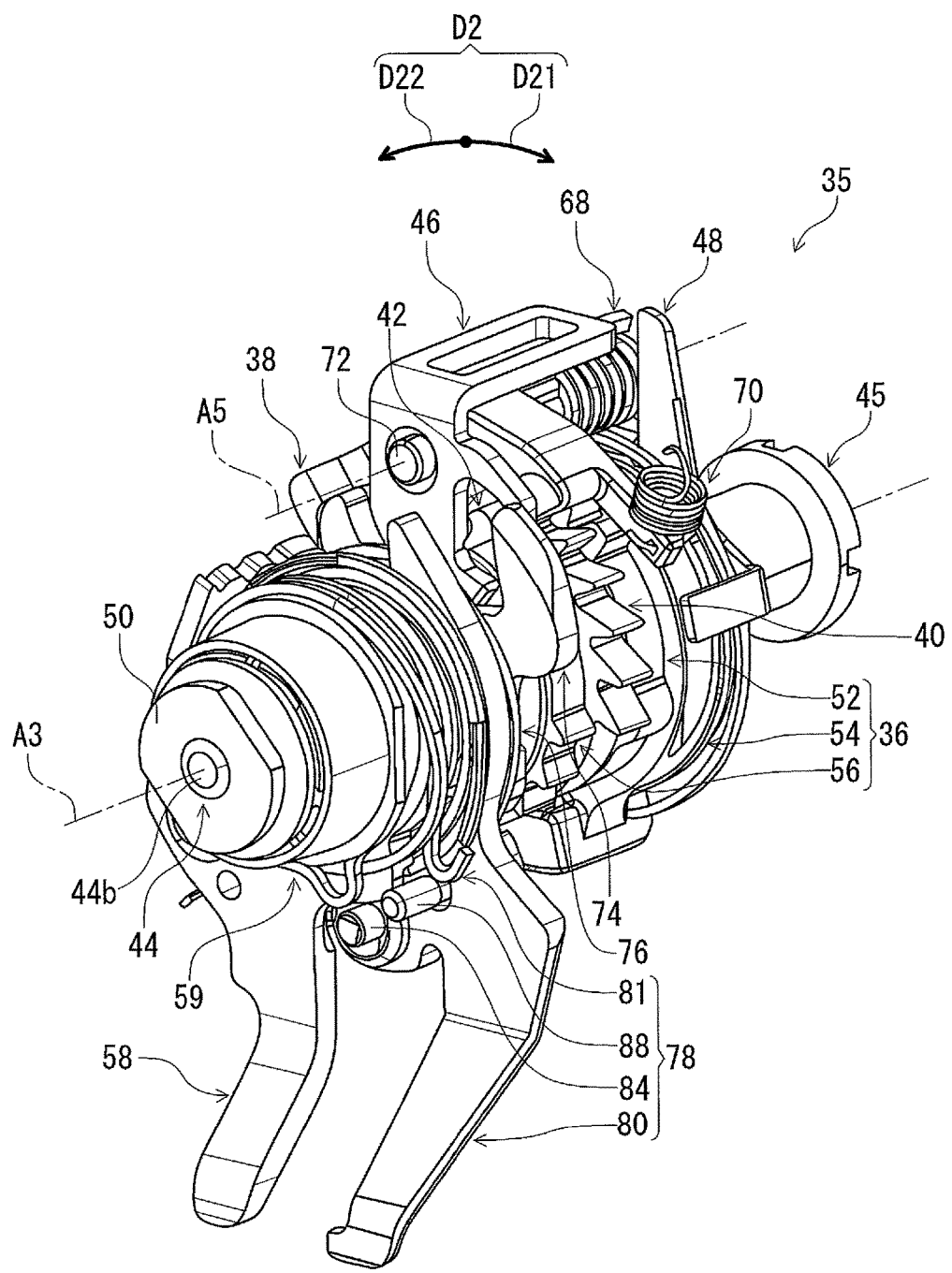
FIG. 8 is a perspective view of a shift operating unit of the bicycle operating device illustrated in FIG. 1.

As seen in FIGS. 5 and 6, the bicycle operating device 10 includes a shift operating unit 35 provided in the base member 12. As seen in FIGS. 7 and 8, the bicycle operating device 10 comprises a cable control body 36, a positioning pawl 38, a stopping member (or ratchet gear) 40, and a stopping pawl 42. The cable control body 36 is movable relative to the base member 12 in a first direction D21 and a second direction D22 that is different from the first direction D21. In this embodiment, the cable control body 36 is rotatable relative to the base member 12 about a main axis A3. In this embodiment, each of the first direction D21 and the second direction D22 is defined as a circumferential direction D2 of the cable control body 36. The second direction D22 is opposite to the first direction D21.

The bicycle operating device 10 includes a support shaft 44, a securing bolt 45, a first base plate 46, a second base plate 48, and a securing nut 49. The support shaft 44 rotatably supports the cable control body 36 and the stopping member 40 about the main axis A3. The first base plate 46 and the second base plate 48 is mounted to the support shaft 44. As seen in FIG. 6, the support shaft 44 includes a first end 44a and a second end 44b. The securing bolt 45 is attached to the first end 44a of the support shaft 44 to secure the first end 44a to the base member 12. The securing nut 49 is attached to the second end 44b of the support shaft 44 to hold the first base plate 46, the cable control body 36, the stopping member 40, and the second base plate 48 between the securing nut 49 and the first end 44a. The second end 44b of the support shaft 44 is coupled to the base member 12 via a coupling member 51 and a fastener 51a.

Figure 9:
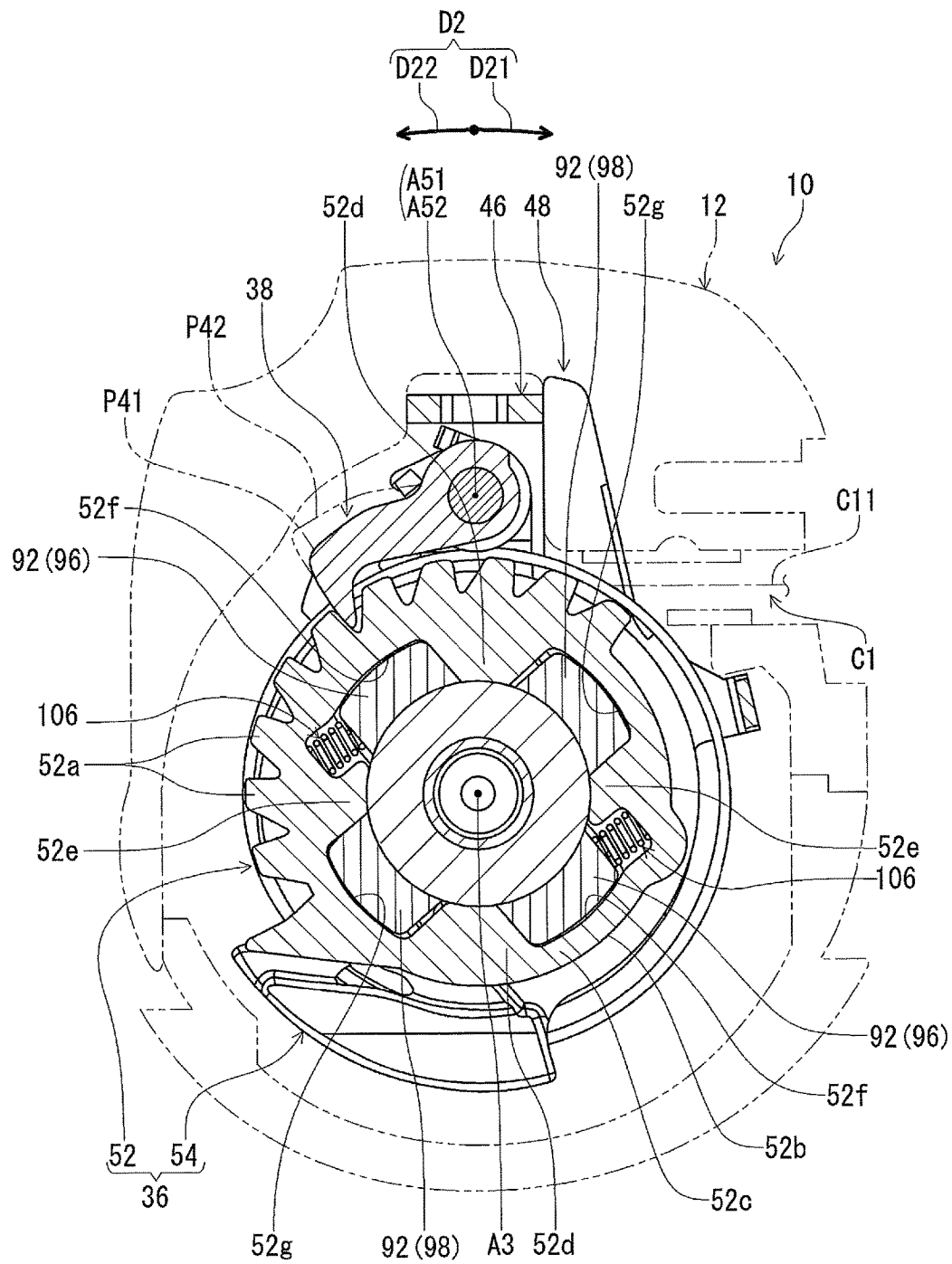
FIG. 9 is a cross-sectional view of the bicycle operating device taken along line IX-IX of FIG. 6.

As seen in FIG. 9, the cable control body 36 includes a positioning part 52. The positioning part 52 includes positioning teeth 52a configured to engage with the positioning pawl 38. In this embodiment, the positioning part 52 has an outer periphery 52b. The positioning teeth 52a are provided on the outer periphery 52b of the positioning part 52. The shape of the positioning part 52 is not limited to this embodiment.

The cable control body 36 includes a cable attachment part 54 to which the control cable C1 is attached. The cable control body 36 is configured to release the control cable C1 when the cable control body 36 is moved in the first direction D21. The cable control body 36 is configured to pull the control cable C1 when the cable control body 36 is moved in the second direction D22. In this embodiment, an end of the inner wire C11 of the control cable C1 is attached to the cable attachment part 54. The cable control body 36 is configured to pull the inner wire C11 of the control cable C1 when the cable control body 36 is moved in the second direction D22. The cable attachment part 54 is rotatable integrally with the positioning part 52 relative to the base member 12 about the main axis A3.

The positioning pawl 38 is configured to engage with the positioning part 52. The positioning pawl 38 is movable between a holding position P41 to stop a movement of the cable control body 36 in the first direction D21, and a non-holding position P42 to allow a movement of the cable control body 36 in the first direction D21. In this embodiment, the positioning pawl 38 has a shape to allow the cable control body 36 to rotate relative to the base member 12 in the second direction D22 even when the positioning pawl 38 is positioned at the holding position P41. The positioning pawl 38 is pivotable relative to the base member 12 about a first pivot axis A51 between the holding position P41 and the non-holding position P42. The first pivot axis A51 is substantially parallel to the main axis A3 and is spaced apart from the main axis A3.

In this embodiment, the positioning pawl 38 is engageable with the positioning teeth 52a. The positioning pawl 38 holds the cable control body 36 at a plurality of rotational positions corresponding to the positioning teeth 52a. The positioning pawl 38 allows the positioning part 52 to rotate about the main axis A3 in the second direction D22 and prevents the positioning part 52 from rotating in the first direction D21 when the positioning pawl 38 is positioned at the holding position P41. The positioning part 52 and the positioning pawl 38 provide a ratchet structure which allows the cable attachment part 54 to rotate about the main axis A3 in the second direction D22 with preventing the cable attachment part 54 from rotating in the first direction D21.

Figure 10:
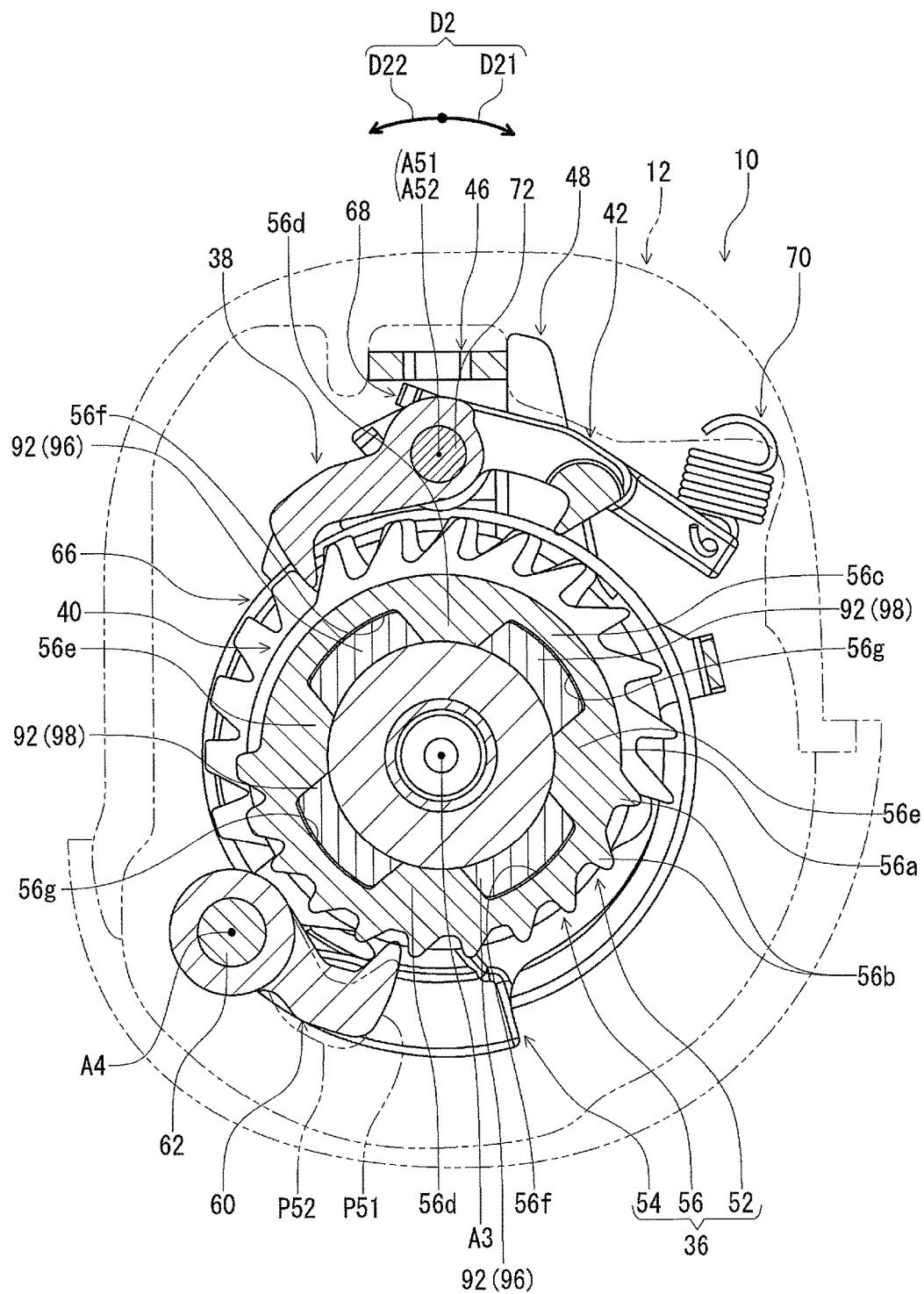
FIG. 10 is a cross-sectional view of the bicycle operating device taken along line X-X of FIG. 6.

As seen in FIG. 10, the cable control body 36 includes a pulling part 56. The pulling part 56 is coupled to the positioning part 52. The pulling part 56 is rotatable integrally with the positioning part 52 and the cable attachment part 54 relative to the base member 12 about the main axis A3. The pulling part 56 has an outer periphery 56a. The pulling part 56 includes pulling teeth 56b provided on the outer periphery 56a of the pulling part 56.

In this embodiment, the positioning part 52 and the pulling part 56 are separate members from the cable attachment part 54. However, at least one of the positioning part 52 and the pulling part 56 can be integrally provided with the cable attachment part 54 as a one-piece unitary member.

Figure 11:
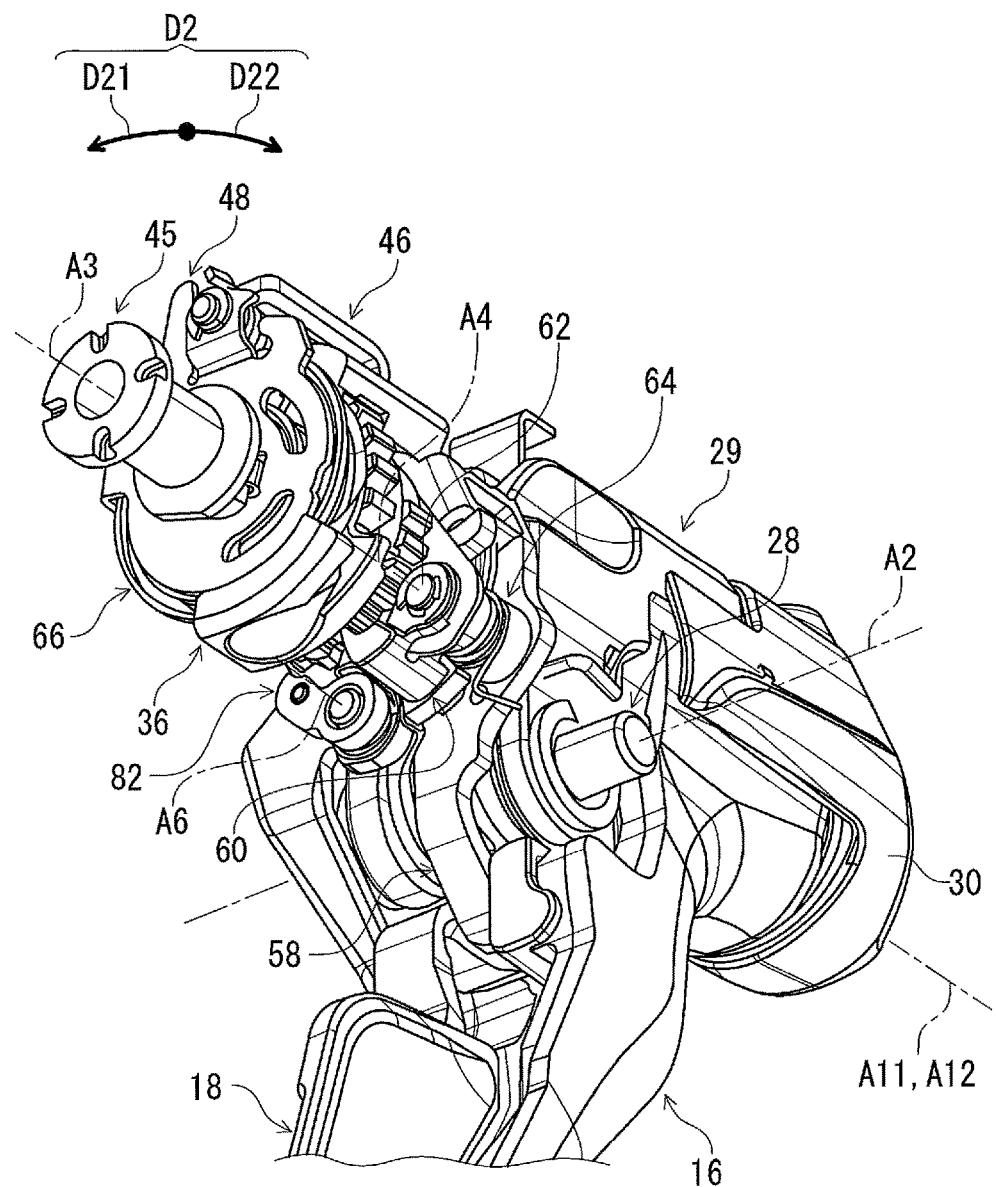
FIG. 11 is an exploded partial perspective view of the bicycle operating device illustrated in FIG. 1.

As seen in FIG. 11, the bicycle operating device 10 includes a pulling lever 58, a pulling-lever biasing element 59 (FIG. 7), a pulling pawl 60, a pivot pin 62, and a pulling-pawl biasing element 64. The pulling lever 58 is operatively coupled to the first operating member 16 to transmit a pivotal movement of the first operating member 16 in the first operating direction D11. The pulling lever 58 is pivotable relative to the base member 12 about the main axis A3. As seen in FIG. 7, the pulling-lever biasing element 59 is configured to bias the pulling lever 58 to pivot relative to the first base plate 46 in the first direction D21. In this embodiment, the pulling-lever biasing element 59 is a spiral spring.

As seen in FIGS. 10 and 11, the pulling pawl 60 is pivotally mounted to the pulling lever 58 via the pivot pin 62. The pulling pawl 60 is pivotable relative to the pulling lever 58 about a pulling pivot axis A4 between a pulling position P51 and a non-pulling position P52. The pulling pawl 60 is configured to engage with the pulling teeth 56b to transmit the pivotal movement of the pulling lever 58 to the pulling part 56 in a state where the pulling pawl 60 is positioned at the pulling position P51. The pulling pawl 60 is spaced apart from the pulling teeth 56b not to engage with the pulling teeth 56b in a state where the pulling pawl 60 is positioned at the non-pulling position P52. The pulling-pawl biasing element 64 is configured to bias the pulling pawl 60 toward the pulling position P51.

The bicycle operating device 10 includes a cable biasing element 66 configured to bias the cable control body 36 to rotate relative to the base member 12 in the first direction D21. In this embodiment, the cable biasing element 66 is a spiral spring.

Figure 12:
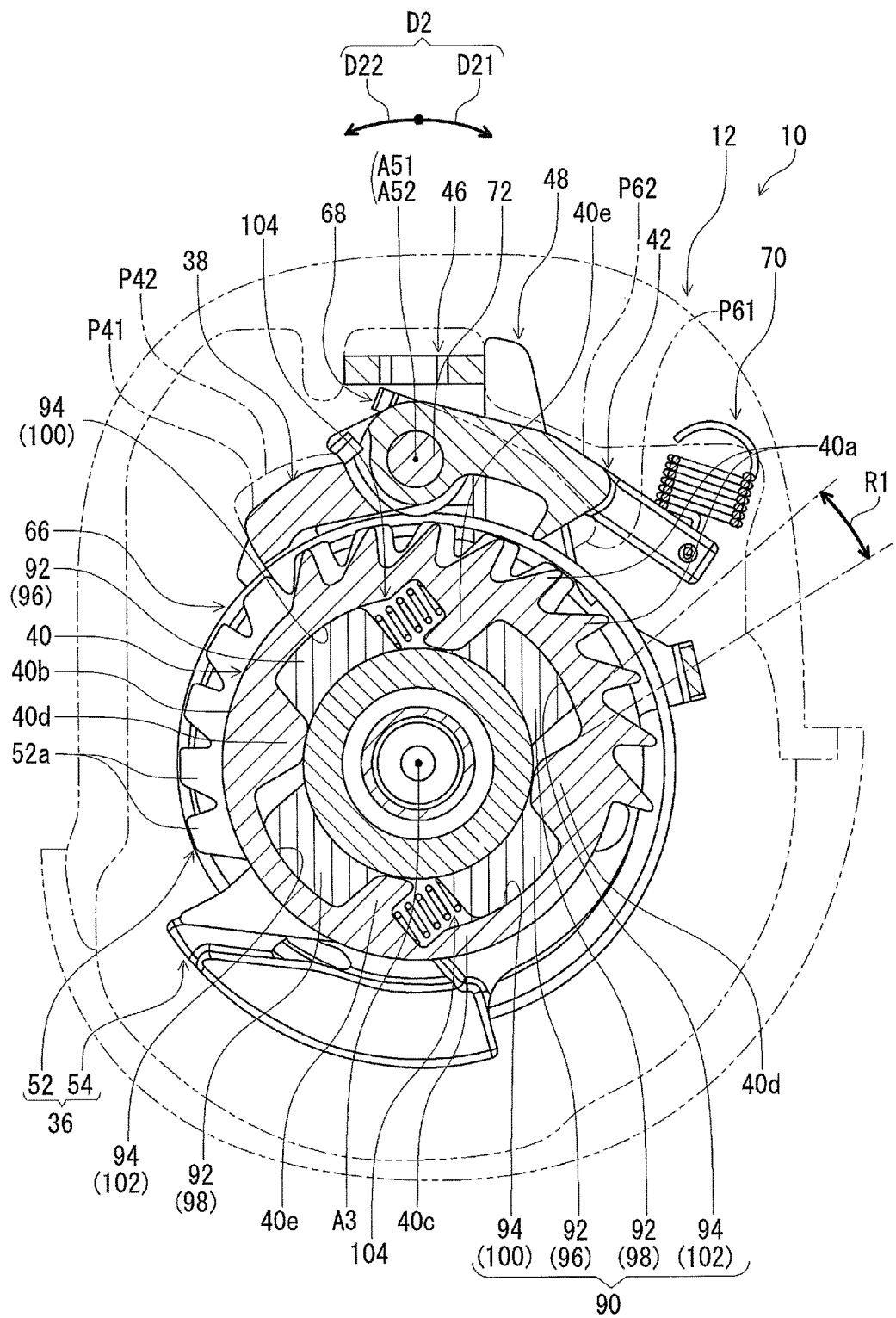
FIG. 12 is a cross-sectional view of the bicycle operating device taken along line XII-XII of FIG. 6.

As seen in FIG. 12, the stopping member 40 is coupled to the cable control body 36 such that the cable control body 36 is movable relative to the stopping member 40 within a movable range R1 while the stopping pawl 42 is arranged at the stopping position P61. The stopping member 40 is movable relative to the base member 12 and the cable control body 36 in the first direction D21 and the second direction D22. In this embodiment, the stopping member 40 is rotatable relative to the cable control body 36 about the main axis A3 within the movable range R1. The stopping member 40 is mounted on the cable control body 36. The stopping member 40 is movably mounted on the cable control body 36 within the movable range R1.

The stopping pawl 42 is configured to engage with the stopping member 40. The stopping pawl 42 is movable between a stopping position P61 to stop a movement of the stopping member 40 in the first direction D21, and a non-stopping position P62 to allow a movement of the stopping member 40 in the first direction D21. The stopping pawl 42 is pivotable relative to the base member 12 about a second pivot axis A52 between the stopping position P61 and the non-stopping position P62. In this embodiment, the second pivot axis A52 coincides with the first pivot axis A51. However, the second pivot axis A52 can be spaced apart from the first pivot axis A51.

The stopping member 40 includes stopping teeth 40a configured to engage with the stopping pawl 42. In this embodiment, the stopping member 40 has an outer periphery 40b. The stopping teeth 40a are provided on the outer periphery 40b of the stopping member 40. However, the shape of the stopping member 40 is not limited to this embodiment. The stopping pawl 42 is configured to engage with one of the stopping teeth 40a.

As seen in FIGS. 7, 8, and 12, the bicycle operating device 10 includes a first biasing element 68 and a second biasing element 70. The first biasing element 68 is configured to bias the positioning pawl 38 toward the holding position P41 (FIG. 12). The second biasing element 70 is configured to bias the stopping pawl 42 toward the non-stopping position P62 (FIG. 12). The second biasing element 70 is configured to position the stopping pawl 42 at the non-stopping position P62 (FIG. 12). In this embodiment, the first biasing element 68 is a torsion spring, and the second biasing element 70 is a tension spring. However, the first biasing element 68 and the second biasing element 70 can be other biasing elements.

In this embodiment, the bicycle operating device 10 includes a first pivot pin 72. The first pivot pin 72 pivotally supports the positioning pawl 38 and the stopping pawl 42. The first pivot pin 72 is mounted to the first base plate 46 and the second base plate 48. The first biasing element 68 is mounted on the first pivot pin 72. The first pivot pin 72 defines the first pivot axis A51 and the second pivot axis A52.

Figure 13:
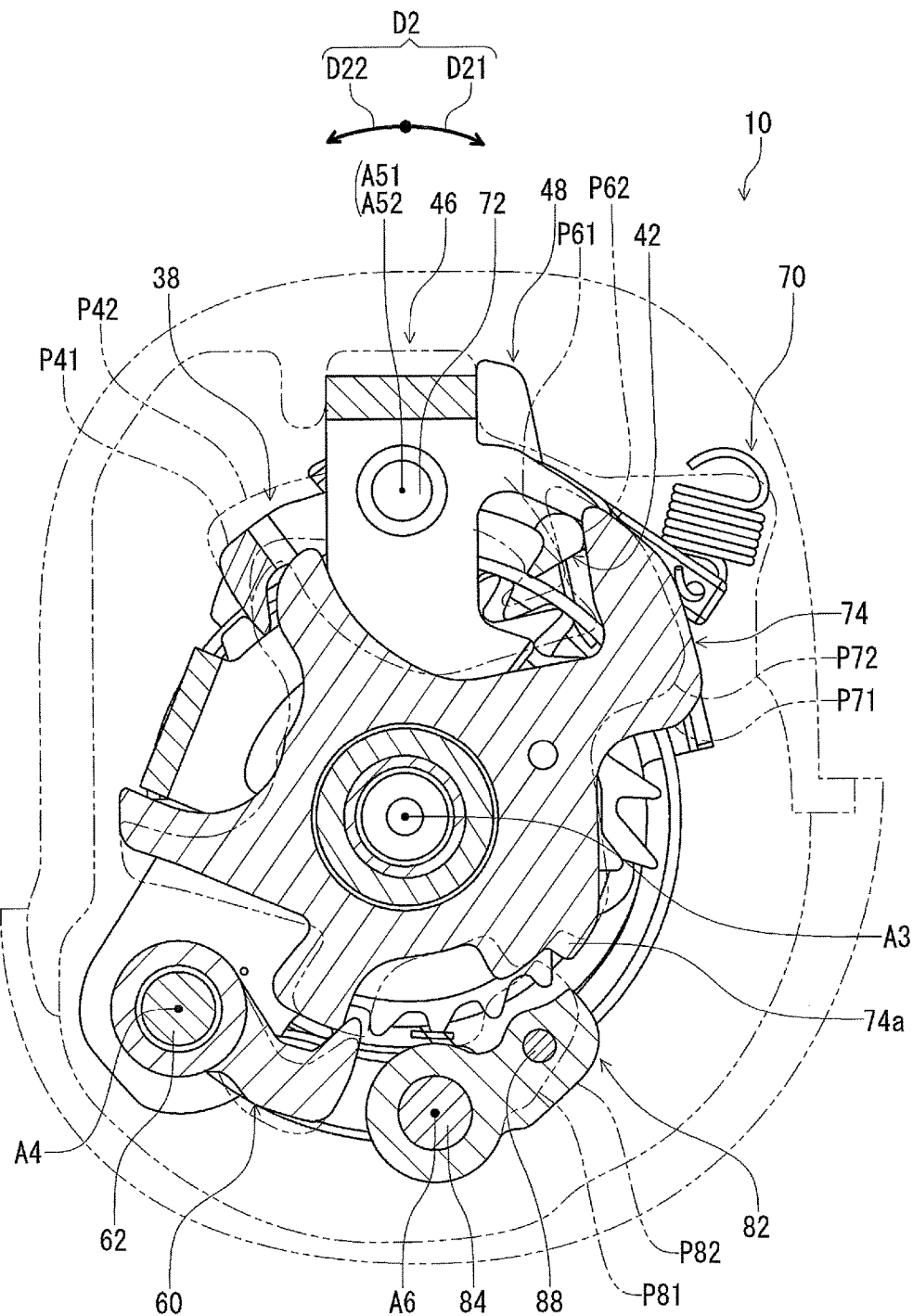
FIG. 13 is a cross-sectional view of the bicycle operating device taken along line XIII-XIII of FIG. 6.

As seen in FIG. 13, the bicycle operating device 10 further comprises a control member 74. The control member 74 is rotatable about the main axis A3 in the second direction D22 in response to a movement of the first operating member 16 in the first operating direction D11 such that the control member 74 moves the positioning pawl 38 from the holding position P41 toward the non-holding position P42 and moves the stopping pawl 42 from the non-stopping position P62 toward the stopping position P61. In this embodiment, the support shaft 44 rotatably supports the control member 74. The control member 74 is rotatable relative to the base member 12 about the main axis A3 between an initial position P71 and an actuated position P72.

As seen in FIGS. 7 and 8, the bicycle operating device 10 includes a control-member biasing element 76. The control-member biasing element 76 is configured to bias the control member 74 in the first direction D21. As seen in FIG. 7, the control member 74 is contactable with a stopper 46a of the first base plate 46. The stopper 46a positions the control member 74 at the initial position P71 (FIG. 13) and allows the control member 74 to rotate in the second direction D22 against a biasing force of the control-member biasing element 76.

Figure 14:
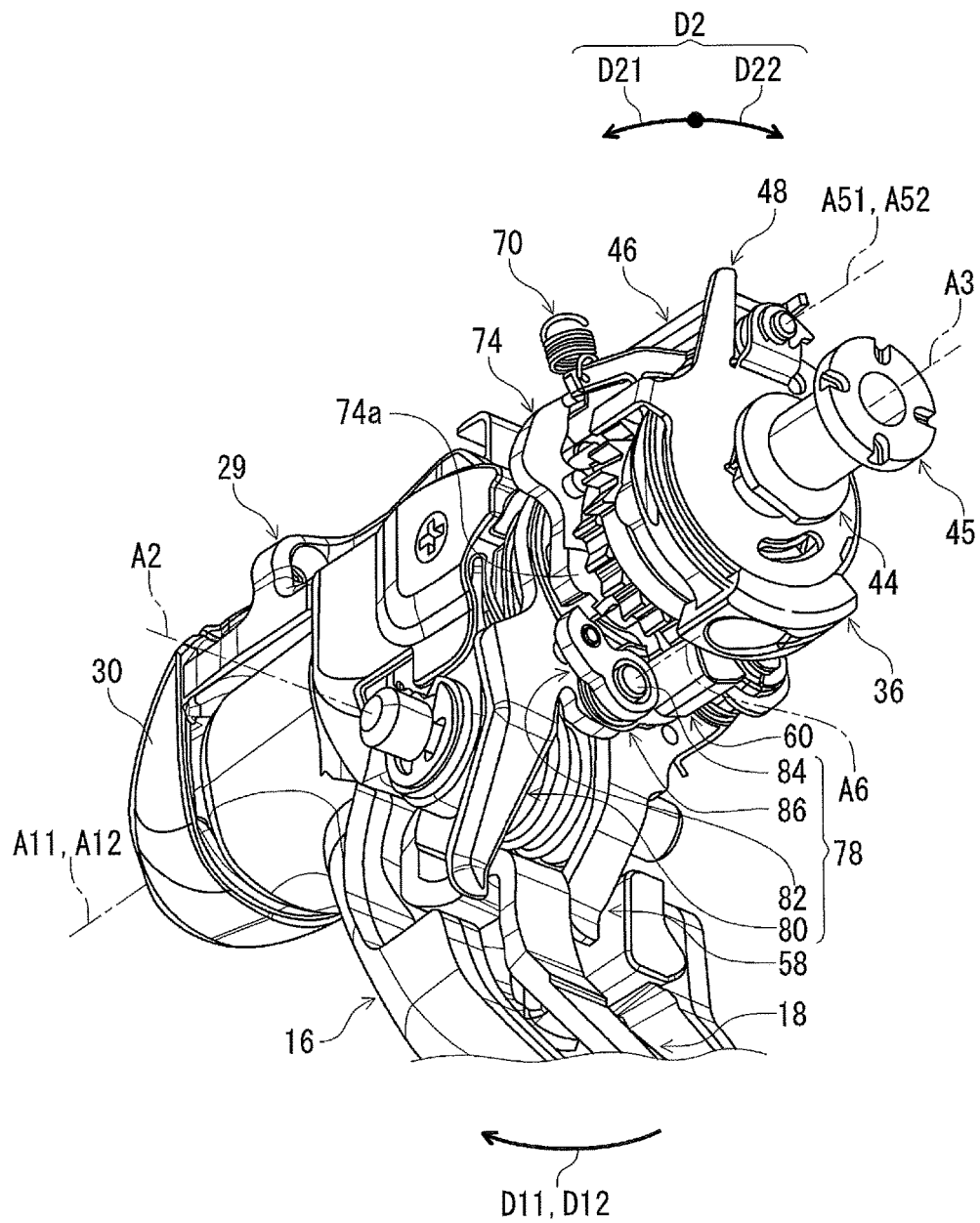
FIG. 14 is an exploded partial perspective view of the bicycle operating device illustrated in FIG. 1.

As seen in FIG. 14, the bicycle operating device 10 further comprises a transmitting structure 78. The transmitting structure 78 is configured to transmit a pivotal movement of the second operating member 18 in the second operating direction D12 to the cable control body 36 such that the cable control body 36 is rotated in the second direction D22.

The transmitting structure 78 includes a transmitting lever 80, a transmitting-lever biasing element 81 (FIG. 8), a transmitting pawl 82, a pivot pin 84, and a transmitting-pawl biasing element 86. The transmitting lever 80 is operatively coupled to the second operating member 18 to transmit the pivotal movement of the second operating member 18 in the second operating direction D12. The transmitting lever 80 is pivotable relative to the base member 12 about the main axis A3. As seen in FIG. 8, the transmitting-lever biasing element 81 is configured to bias the transmitting lever 80 to pivot relative to the first base plate 46 in the first direction D21. In this embodiment, the transmitting-lever biasing element 81 is a spiral spring.

As seen in FIG. 13, the transmitting pawl 82 is pivotally mounted to the transmitting lever 80 via the pivot pin 84. The transmitting pawl 82 is pivotable relative to the transmitting lever 80 about a transmitting pivot axis A6 between a transmitting position P81 and a non-transmitting position P82. The control member 74 includes an abutment 74a. The transmitting pawl 82 is engageable with the abutment 74a in a state where the transmitting pawl 82 is positioned at the transmitting position P81. The transmitting pawl 82 is spaced apart from the abutment 74a not to engage with the abutment 74a in a state where the transmitting pawl 82 is positioned at the non-transmitting position P82. The transmitting-pawl biasing element 86 is configured to bias the transmitting pawl 82 toward the transmitting position P81.

As seen in FIG. 8, the transmitting structure 78 includes a positioning pin 88 attached to the transmitting pawl 82. The pulling lever 58 includes a guide portion 58a. The positioning pin 88 is in contact with the guide portion 58a. The transmitting pawl 82 is guided by the guide portion 58a via the positioning pin 88 between the transmitting position P81 and the non-transmitting position P82 (FIG. 13). The transmitting pawl 82 is guided by the guide portion 58a from the non-transmitting position P82 to the transmitting position P81 when the second operating member 18 is pivoted from the second rest position P21 toward the second operated position P22 while the first operating member 16 is positioned at the first rest position P11 (FIG. 4).

As seen in FIG. 12, the bicycle operating device 10 further comprises a restricting structure for restricting means) 90 configured to restrict a relative movement between the cable control body 36 and the stopping member 40 within the movable range R1. The restricting structure 90 includes a protrusion 92 and a recess 94. In this embodiment, the restricting structure 90 includes protrusions 92 and recesses 94. The protrusion 92 is provided at one of the cable control body 36 and the stopping member 40. The recess 94 is provided at the other of the cable control body 36 and the stopping member 40.

Figure 15:
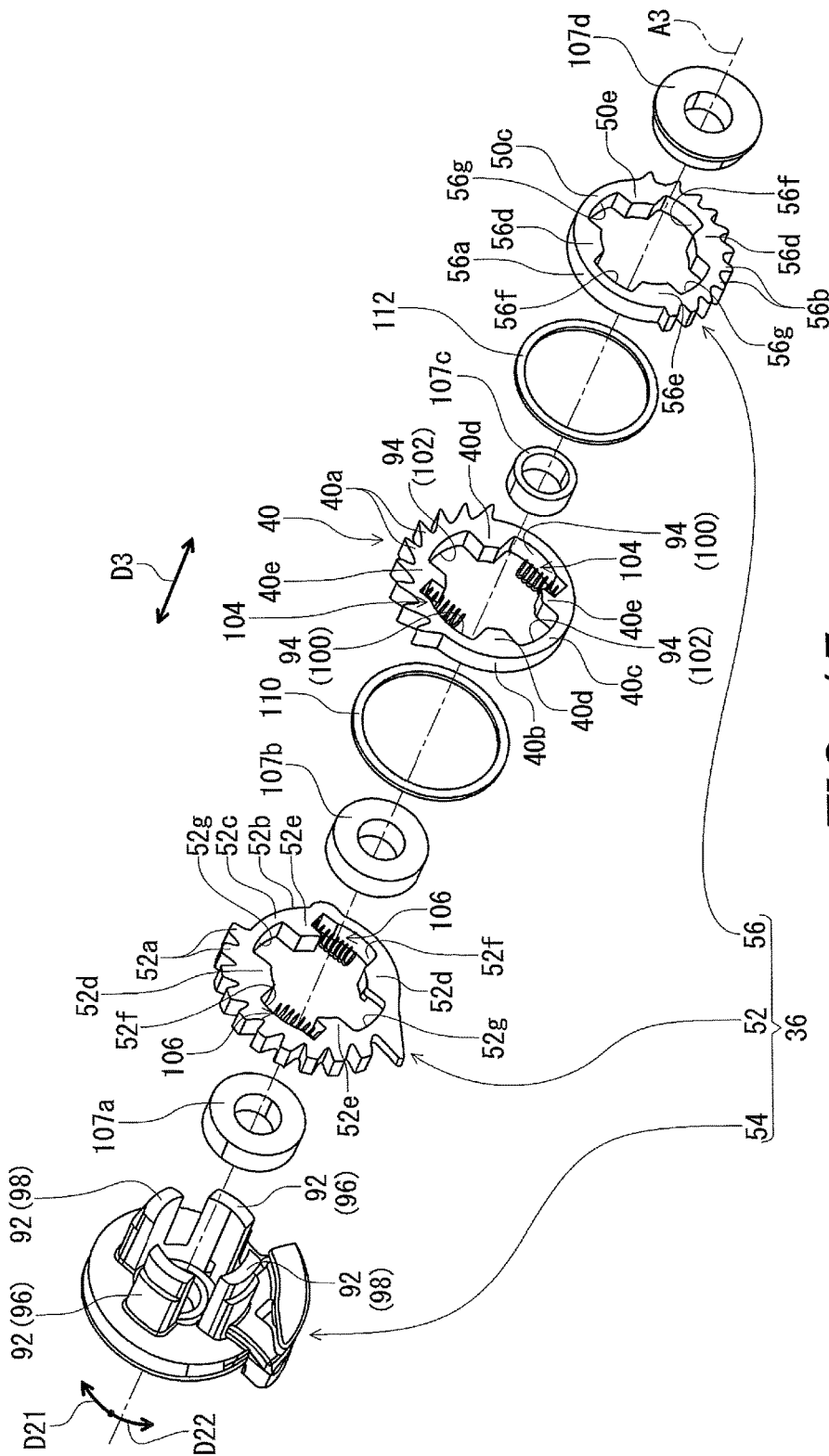
FIG. 15 is an exploded partial perspective view of a restricting structure of the bicycle operating device illustrated in FIG. 1.

In this embodiment, as seen in FIG. 15, the protrusions 92 are provided at the cable control body 36. The recesses 94 are provided at the stopping member 40. However, the protrusions 92 can be provided at the stopping member 40, and the recesses 94 can be provided at the cable control body 36.

The protrusions 92 includes a pair of first protrusions 96 and a pair of second protrusions 98. The first protrusions 96 extend from the cable attachment part 54 of the cable control body 36 in an axial direction D3. The second protrusions 98 extend from the cable attachment part 54 of the cable control body 36 in the axial direction D3. The first protrusions 96 and the second protrusions 98 are alternatingly arranged in the circumferential direction D2 of the cable control body 36. The first protrusions 96 are opposite to each other with respect to the main axis A3. The second protrusions 98 are opposite to each other with respect to the main axis A3. In this embodiment, the first protrusions 96 and the second protrusions 98 are integrally provided with the cable attachment part 54 as a one-piece unitary member. However, at least one of the first protrusions 96 and the second protrusions 98 can be a separate member from the cable attachment part 54.

As seen in FIGS. 12 and 15, the recess 94 is dimensioned such that the protrusion 92 is movable within the movable range R1 in the first direction D21 and the second direction D22. In this embodiment, the recesses 94 include a pair of first recesses 100 and a pair of second recesses 102. Specifically, the stopping member 40 has an annular portion 40c, a pair of first stoppers 40d, and a pair of second stoppers 40e. The first stopper 40d protrude radially inwardly from an inner periphery of the annular portion 40c of the stopping member 40. The second stopper 40e protrude radially inwardly from the inner periphery of the annular portion 40c. The first stopper 40d and the second stopper 40e are alternatingly arranged in the circumferential direction D2 of the cable control body 36. The first stopper 40d are opposite to each other with respect to the main axis A3. The second stopper 40e are opposite to each other with respect to the main axis A3. Each of the first recesses 100 is defined between the first stopper 40d and the second stopper 40e. Each of the second recesses 102 is defined between the first stopper 40d and the second stopper 40e. The first protrusions 96 are respectively provided in the first recesses 100. The second protrusions 98 are respectively provided in the second recesses 102.

Figure 16:
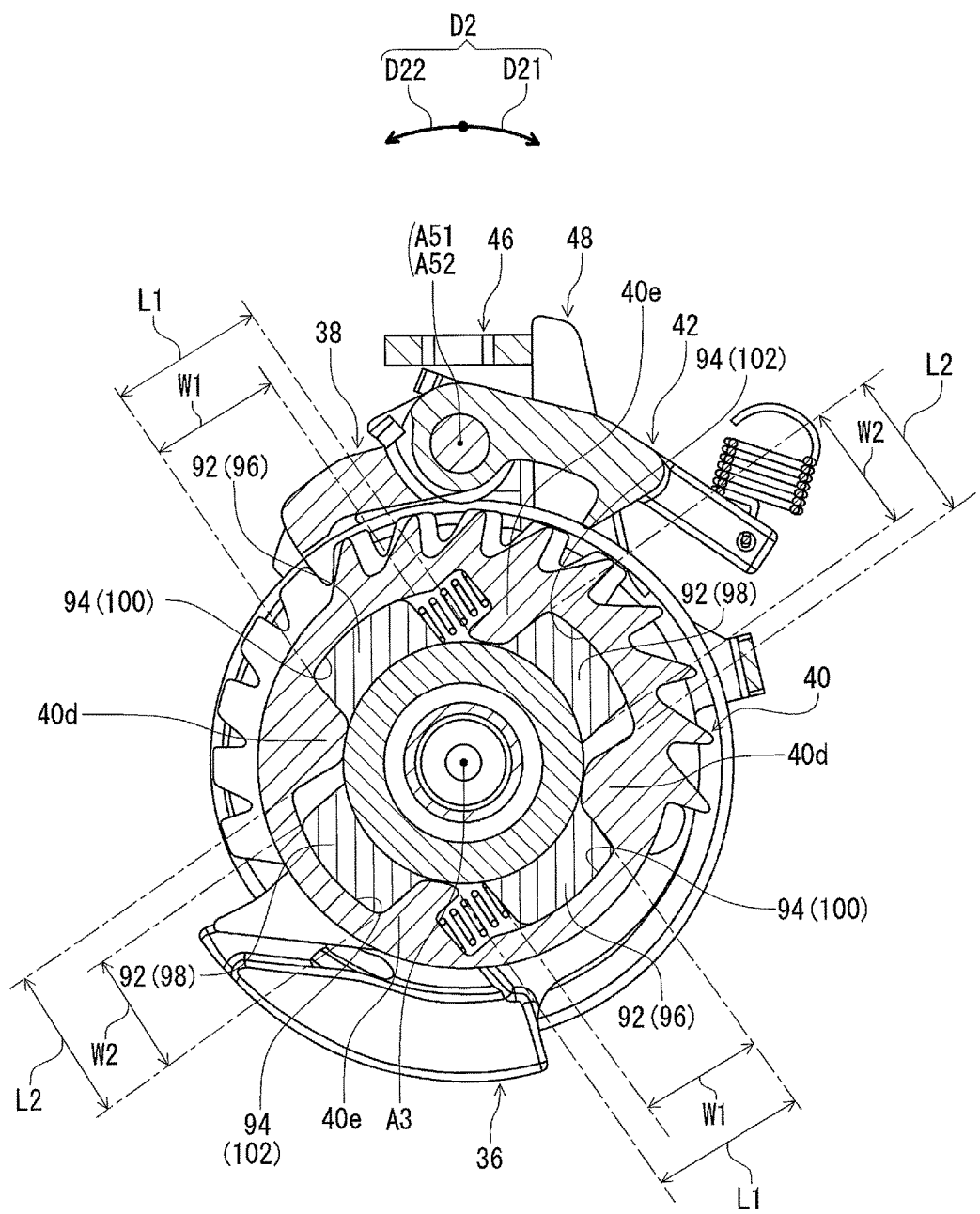
FIG. 16 is a cross-sectional view of the shift operating unit of the bicycle operating device illustrated in FIG. 1.

As seen in FIG. 16, the first recess 100 has a first circumferential distance L1 defined between the first stopper 40d and the second stopper 40e in the circumferential direction D2. The second recess 102 has a second circumferential distance L2 defined between the second stopper 40e and the first stopper 40d in the circumferential direction D2. The first protrusion 92 has a first circumferential width W1 defined in the circumferential direction D2. The second protrusion 92 has a second circumferential width W2 defined in the circumferential direction D2. The first circumferential distance L1 is larger than the first circumferential width W1. The second circumferential distance L2 is larger than the second circumferential width W2.

As seen in FIGS. 12 and 15, the bicycle operating device 10 further comprises a biasing member 104 configured to bias the stopping member 40 relative to the cable control body 36 in the first direction D21. The biasing member 104 is arranged between the protrusion 92 and the recess 94 so as to bias the stopping member 40 relative to the cable control body 36 in the first direction D21.

In this embodiment, the bicycle operating device 10 further comprises biasing members 104 configured to bias the stopping member 40 relative to the cable control body 36 in the first direction D21. The biasing members 104 are respectively arranged between the first protrusions 96 and the first recesses 100 so as to bias the stopping member 40 relative to the cable control body 36 in the first direction D21. Specifically, the biasing members 104 are respectively arranged between the first protrusions 96 and the second stopper 40e so as to bias the stopping member 40 relative to the cable control body 36 in the first direction D21. The first stopper 40d is contactable with the first protrusion 92. The second stopper 40e is contactable with the second protrusion 92. The first stopper 40d are respectively pushed against the first protrusions 96 by biasing forces of the biasing members 104. The second stopper 40e are respectively pushed against the second protrusions 98 by the biasing forces of the biasing members 104.

As seen in FIGS. 9 and 15, the cable attachment part 54 is coupled to the positioning part 52 and is rotatable together with the positioning part 52 relative to the base member 12 about the main axis A3. Specifically, the positioning part 52 has an annular portion 52c, a pair of third stoppers 52d, and a pair of fourth stoppers 52e. The third stoppers 52d protrude radially inwardly from an inner periphery of the annular portion of the positioning part 52. The fourth stoppers 52e protrude radially inwardly from the inner periphery of the annular portion. The third stoppers 52d and the fourth stoppers 52e are alternatingly arranged in the circumferential direction D2 of the cable control body 36. The third stoppers 52d are opposite to each other with respect to the main axis A3. The fourth stoppers 52e are opposite to each other with respect to the main axis A3. The positioning part 52 includes a pair of third recesses 52f and a pair of fourth recesses 52g. Each of the third recesses 52f is defined between the third stopper 52d and the fourth stopper 52e. Each of the fourth recesses 52g is defined between the third stopper 52d and the fourth stopper 52e. The first protrusions 96 are respectively provided in the third recesses 52f. The second protrusions 98 are respectively provided in the fourth recesses 52g.

Figure 17:
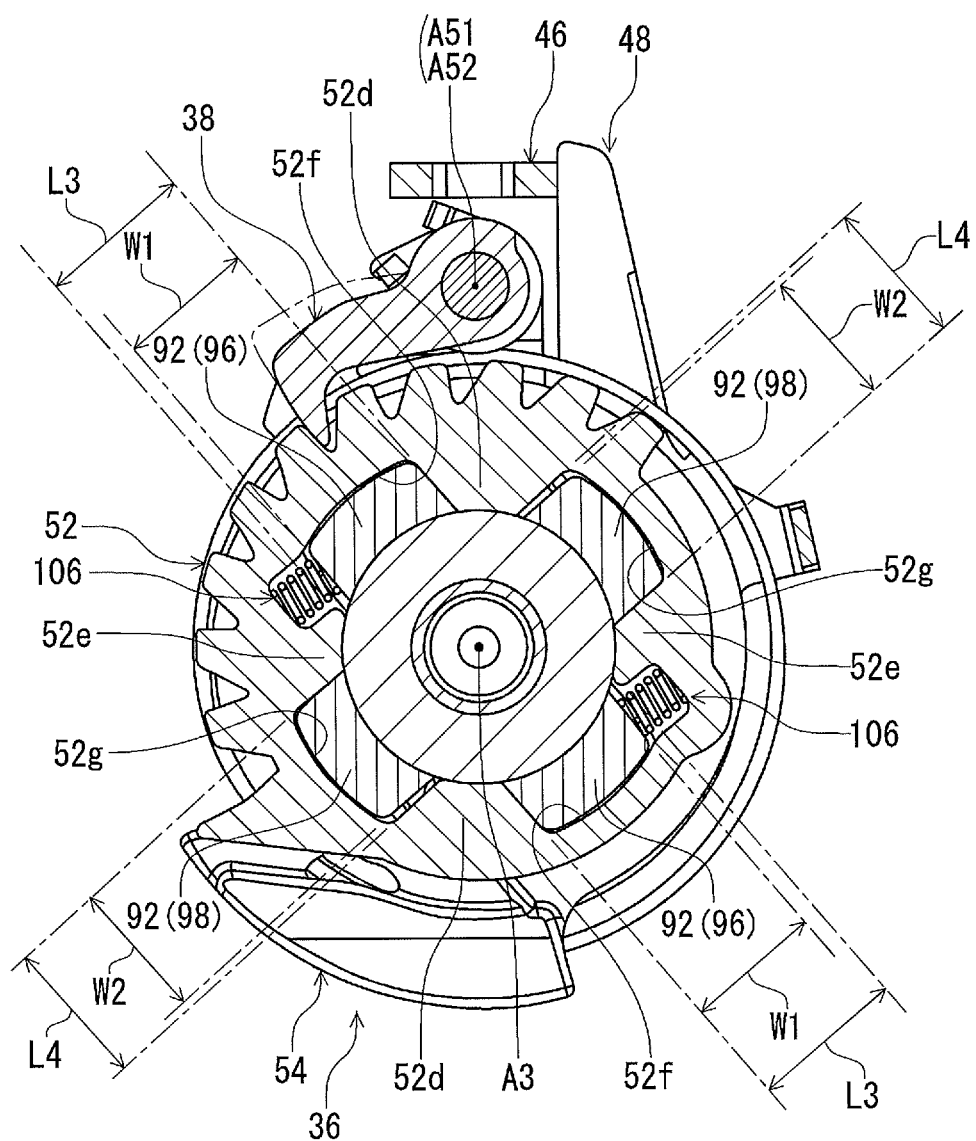
FIG. 17 is a cross-sectional view of the shift operating unit of the bicycle operating device illustrated in FIG. 1.

As seen in FIG. 17, the third recess 52f has a third circumferential distance L3 defined between the third stopper 52d and the fourth stopper 52e in the circumferential direction D2. The fourth recess 52g has a fourth circumferential distance L4 defined between the fourth stopper 52e and the third stopper 52d in the circumferential direction D2. The third circumferential distance L3 is larger than the first circumferential width W1. The fourth circumferential distance L4 is larger than the second circumferential width W2.

As seen in FIGS. 9 and 15, the cable control body 36 includes a pair of additional biasing members 106 configured to bias the positioning part 52 relative to the cable attachment part 54 in the second direction D22. The additional biasing members 106 are respectively arranged between the first protrusions 96 and the third recesses 52f so as to bias the positioning part 52 relative to the cable attachment part 54 in the second direction D22.

Specifically, the additional biasing members 106 are respectively arranged between the first protrusions 96 and the fourth stoppers 52e so as to bias the positioning part 52 relative to the cable attachment part 54 in the second direction D22. The additional biasing member 106 is compressed between the first protrusion 92 and the fourth stopper 52e. The third stopper 52d is contactable with the first protrusion 92. The fourth stopper 52e is contactable with the second protrusion 92. The third stoppers 52d are respectively pushed against the first protrusions 96 by biasing forces of the additional biasing members 106. The fourth stoppers 52e are respectively pushed against the second protrusions 98 by the biasing forces of the additional biasing members 106.

As seen in FIGS. 10 and 15, the pulling part 56 is coupled to the cable attachment part 54 and is rotatable together with the cable attachment part 54 relative to the base member 12 about the main axis A3. Specifically, the pulling part 56 has an annular portion 56c, a pair of fifth stoppers 56d, and a pair of sixth stoppers 56e. The fifth stoppers 56d protrude radially inwardly from an inner periphery of the annular portion 56c of the pulling part 56. The sixth stoppers 56e protrude radially inwardly from the inner periphery of the annular portion. The fifth stoppers 56d and the sixth stoppers 56e are alternatingly arranged in the circumferential direction D2 of the cable control body 36. The fifth stoppers 56d are opposite to each other with respect to the main axis A3. The sixth stoppers 56e are opposite to each other with respect to the main axis A3. The pulling part 56 includes a pair of fifth recesses 56f and a pair of sixth recesses 56g. Each of the fifth recesses 56f is defined between the fifth stopper 56d and the sixth stopper 56e. Each of the sixth recesses 56g is defined between the fifth stopper 56d and the sixth stopper 56e. The first protrusions 96 are respectively provided in the fifth recesses 56f. The second protrusions 98 are respectively provided in the sixth recesses 56g.

Figure 18:
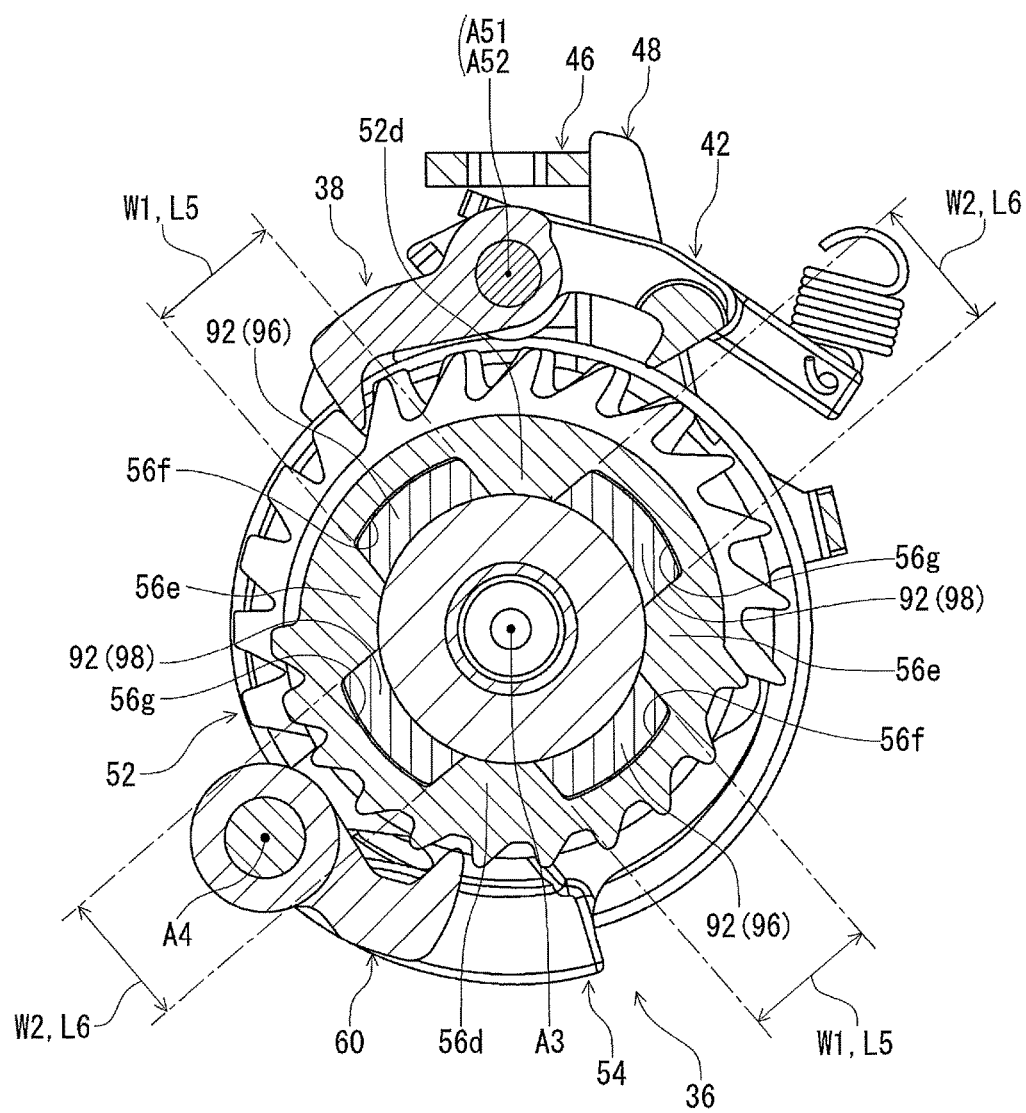
FIG. 18 is a cross-sectional view of the shift operating unit of the bicycle operating device illustrated in FIG. 1.

As seen in FIG. 18, the fifth recess 56f has a fifth circumferential distance L5 defined between the fifth stopper 56d and the sixth stopper 56e in the circumferential direction D2. The sixth recess 56g has a sixth circumferential distance L6 defined between the sixth stopper 56e and the fifth stopper 56d in the circumferential direction D2. The fifth circumferential distance L5 is substantially equal to the first circumferential width W1. The sixth circumferential distance L6 is substantially equal to the second circumferential width W2. Namely, the first protrusions 96 are respectively fitted in the fifth recesses 56f. The second protrusions 98 are respectively fitted in the sixth recesses 56g.

As seen in FIG. 15, the stopping member 40 is provided between the positioning part 52 and the pulling part 56 in the axial direction D3. The positioning part 52 is provided between the cable attachment part 54 and the stopping member 40 in the axial direction D3. Bushes 107a and 107b are provided in the positioning part 52 to rotatably support the positioning part 52. Bushes 107b and 107c are provided in the stopping member 40 to rotatably support the stopping member 40. The bushes 107c and 107d are provided in the pulling part 56 to rotatably support the pulling part 56. The support shaft 44 (FIG. 6) extends through holes of the bushes 107a to 107d. A ring 110 is provided between the positioning part 52 and the stopping member 54 in the axial direction D3. A ring 112 is provided between the stopping member 54 and the pulling part 56 in the axial direction D3.

A cable pulling (winding) operation of the bicycle operating device 10 will be described below referring to FIGS. 19 and 20.

Figure 19:
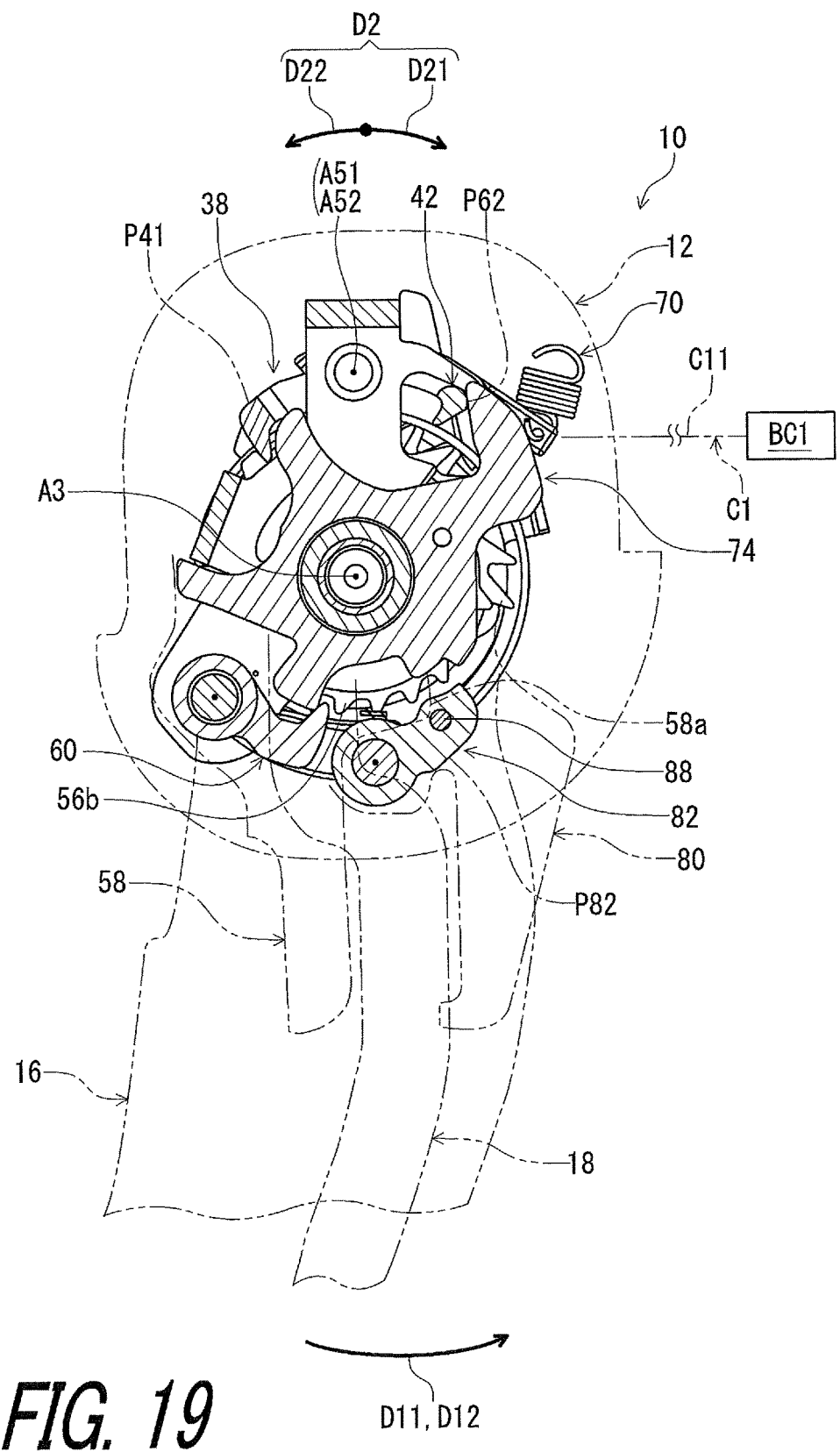
FIG. 19 is a cross-sectional view of the bicycle operating device illustrated in FIG. 1 (rest position).

As seen in FIG. 19, the first operating member 16, the second operating member 18, the pulling lever 58, and the transmitting lever 80 are pivoted together relative to the base member 12 about the main axis A3 when the first operating member 16 is pivoted by the rider relative to the base member 12 in the first operating direction D11. The pivotal movement of the pulling lever 58 moves the pulling pawl 60 in the second direction D22 to engage with one of the pulling teeth 56b. This rotates the cable control body 36 about the main axis A3 in the second direction D22 to pull the inner wire C11 of the control cable C1.

Since the pulling lever 58 and the transmitting lever 80 are pivoted together relative to the base member 12 about the main axis A3, the transmitting pawl 82 is positioned at the non-transmitting position P82 by the positioning pin 88 and the guide portion 58a of the pulling lever 58. This prevents the pivotal movement of the second operating member 18 from being transmitted to the control member 74. Thus, as seen in FIG. 20, the positioning pawl 38 and the stopping pawl 42 are positioned at the holding position P41 and the non-stopping position P62.

Figure 20:
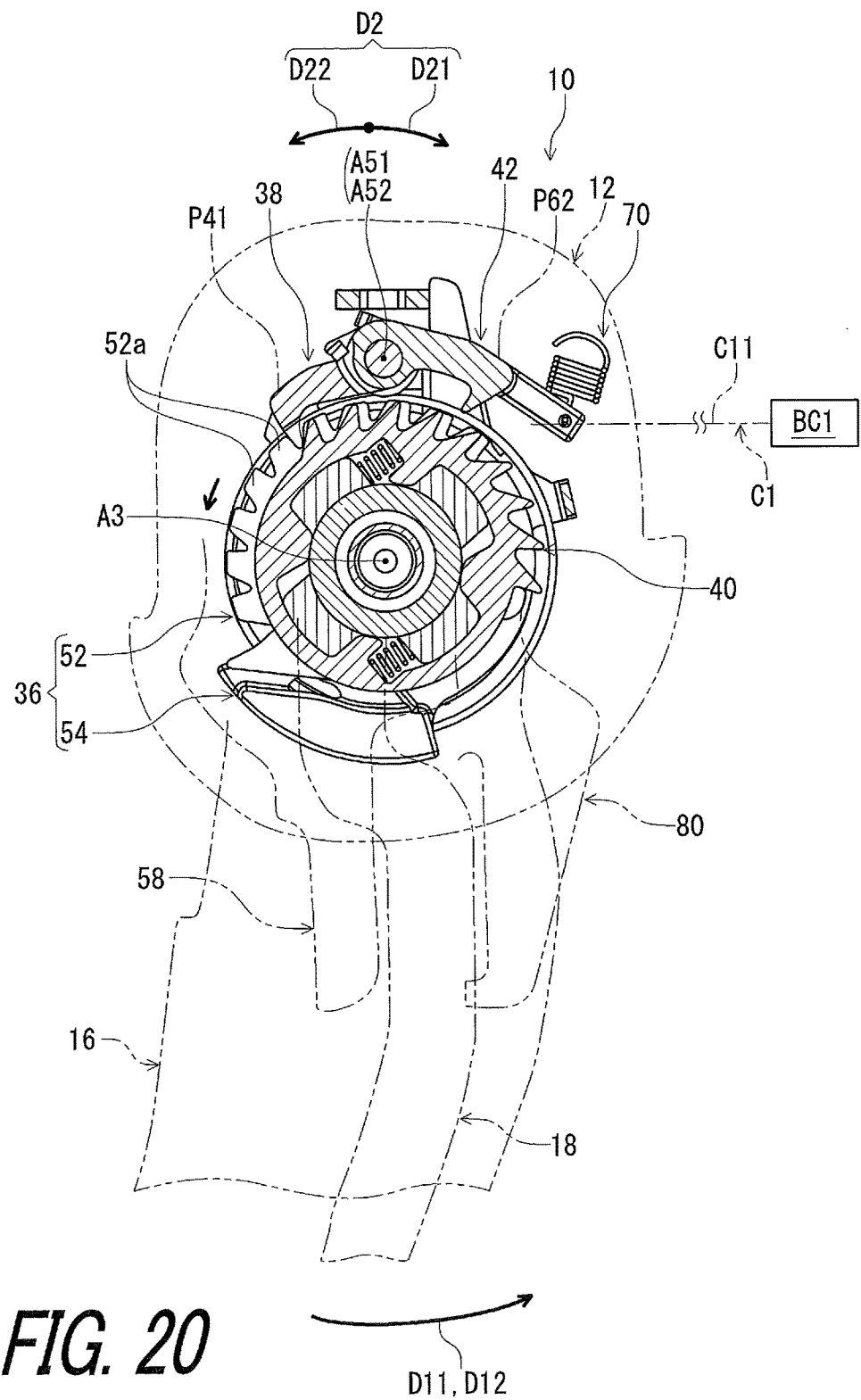
FIG. 20 is a cross-sectional view of the bicycle operating device illustrated in FIG. 1 (rest position).

As seen in FIG. 20, the positioning pawl 38 and the positioning teeth 52a allow the cable control body 36 to rotate about the main axis A3 in the second direction D22 with preventing the cable attachment part 54 from rotating in the first direction D21. Thus, the inner wire C11 of the control cable C1 is pulled and positioned at one of pulling positions.

A cable releasing operation of the bicycle operating device 10 will be described below referring to FIGS. 13 and 21 to 23.

Figure 21:
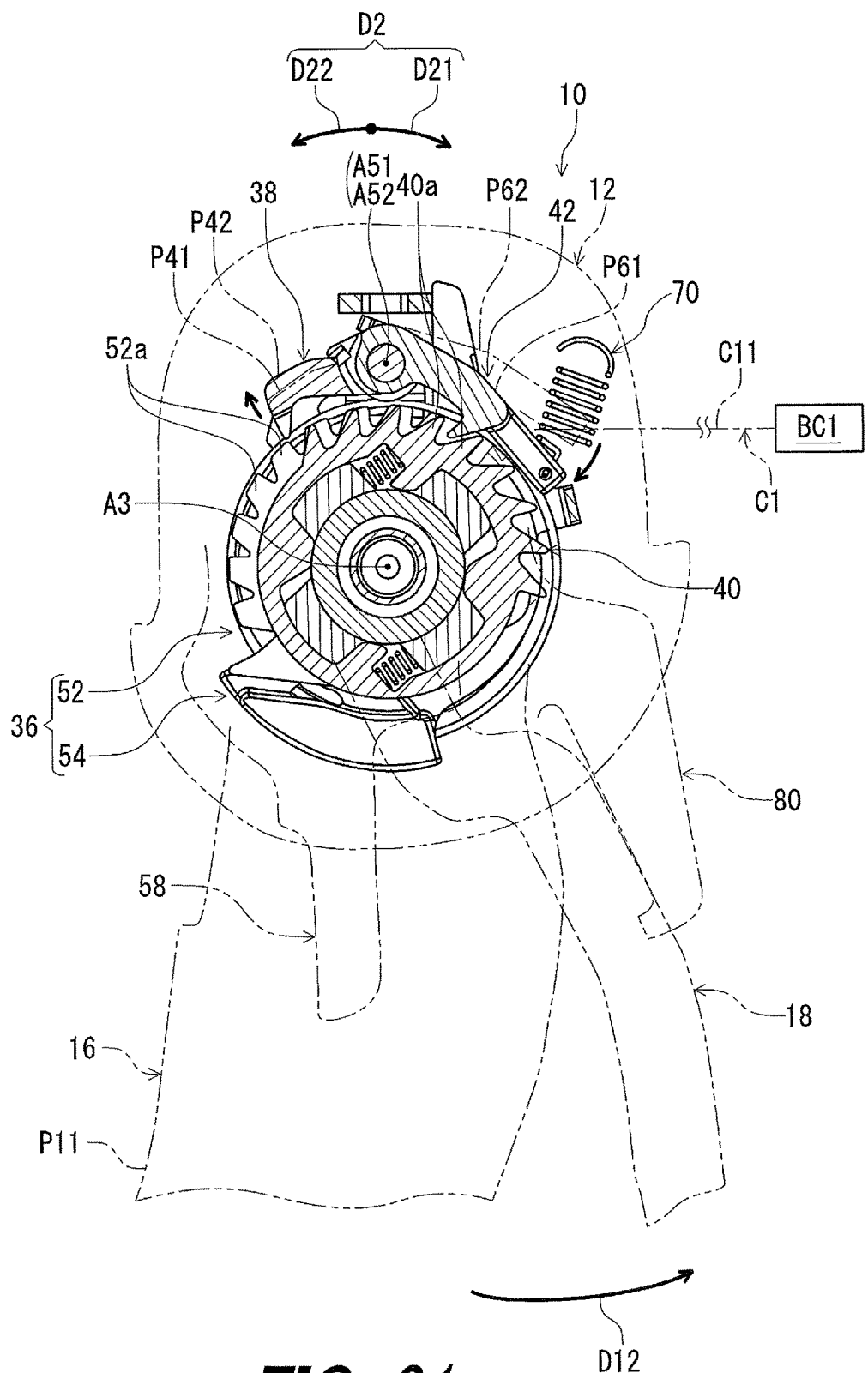
FIG. 21 is a cross-sectional view of the bicycle operating device illustrated in FIG. 1 (second operated position).

As seen in FIG. 21, the second operating member 18 and the transmitting lever 80 are pivoted together relative to the base member 12 about the main axis A3 when the second operating member 18 is pivoted by the rider relative to the base member 12 about the main axis A3 in the second operating direction D12. At this time, the first operating member 16 remains at the first rest position P11, and the pulling lever 58 remains at the rest position.

As seen in FIG. 13, the pivotal movement of the transmitting lever 80 relative to the pulling lever 58 moves the transmitting pawl 82 from the non-transmitting position P82 to the transmitting position P81 since the positioning pin 88 is guided toward the control member 74 by the guide portion 58a. This brings the transmitting pawl 82 into engagement with the abutment 74a of the control member 74. Thus, the pivotal movement of the second operating member 18 is transmitted to the control member 74 via the transmitting lever 80 and the transmitting pawl 82, rotating the control member 74 relative to the base member 12 in the second direction D22.

As seen in FIG. 21, the rotation of the control member 74 moves the stopping pawl 42 to the stopping position P61 and moves the positioning pawl 38 to the non-holding position P42. The stopping pawl 42 comes into engagement with the stopping teeth 40a of the stopping member 40 when the control member 74 moves the stopping pawl 42 from the stopping position P61 to the non-stopping position P62. The positioning pawl 38 disengages from the positioning teeth 52a when the control member 74 moves the positioning pawl 38 from the holding position P41 to the non-holding position P42.

Figure 22:
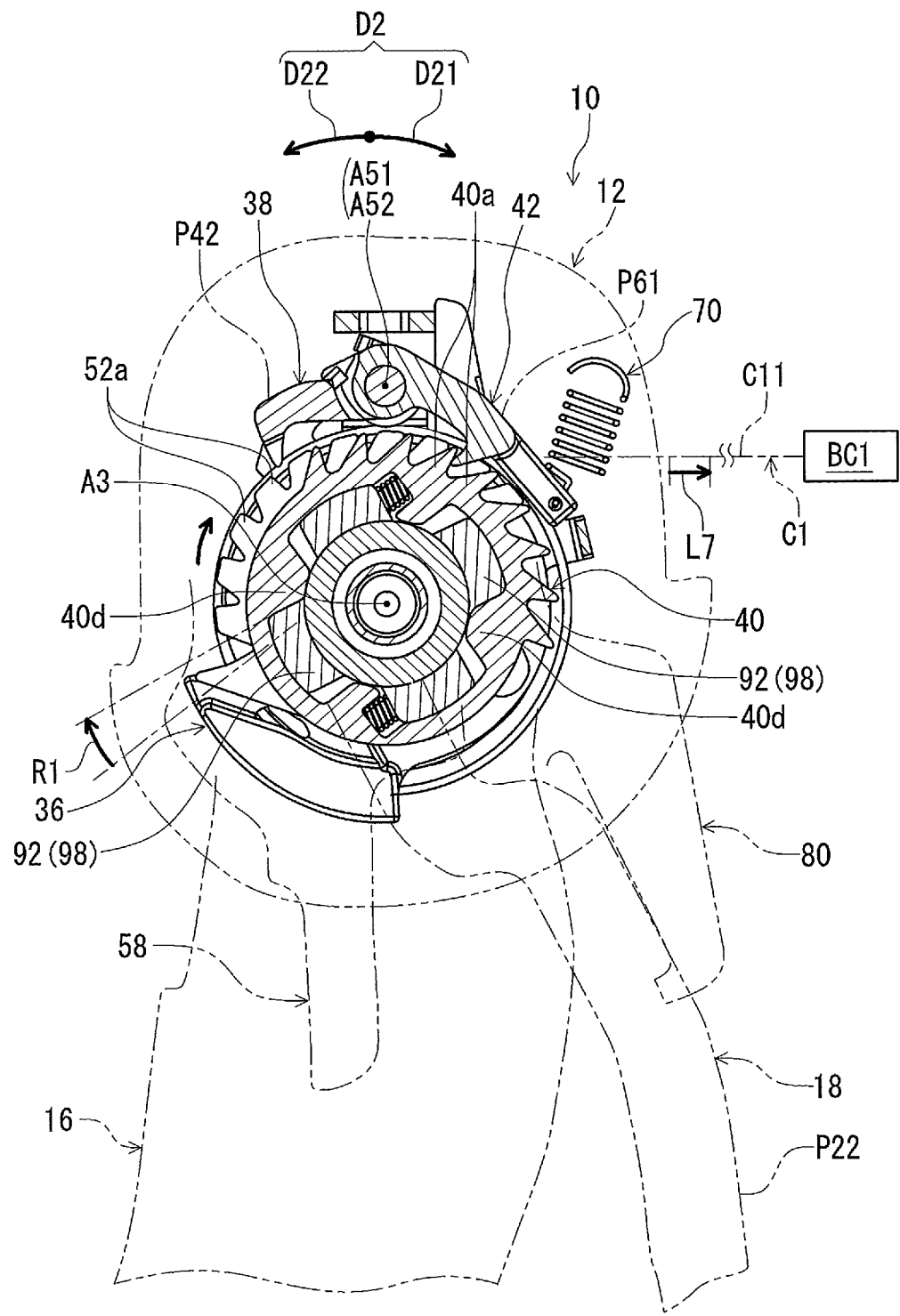
FIG. 22 is a cross-sectional view of the bicycle operating device illustrated in FIG. 1 (second operated position).

As seen in FIG. 22, the stopping pawl 42 comes into engagement with the stopping teeth 40a of the stopping member 40 before the positioning pawl 38 completely disengages from the positioning teeth 52a. This stops the rotation of the stopping member 40 relative to the base member 12 in the first direction D21. The stopping member 40 is coupled to the cable control body 36 such that the cable control body 36 is movable relative to the stopping member 40 within the movable range R1 while the stopping pawl 42 is arranged at the stopping position P61. Thus, the cable control body 36 (the cable attachment part 54, the positioning part 52, and the pulling part 56) rotates relative to the stopping member 40 about the main axis A3 within the movable range R1 in the first direction D21 even when the stopping member 40 stops rotating.

Figure 23:
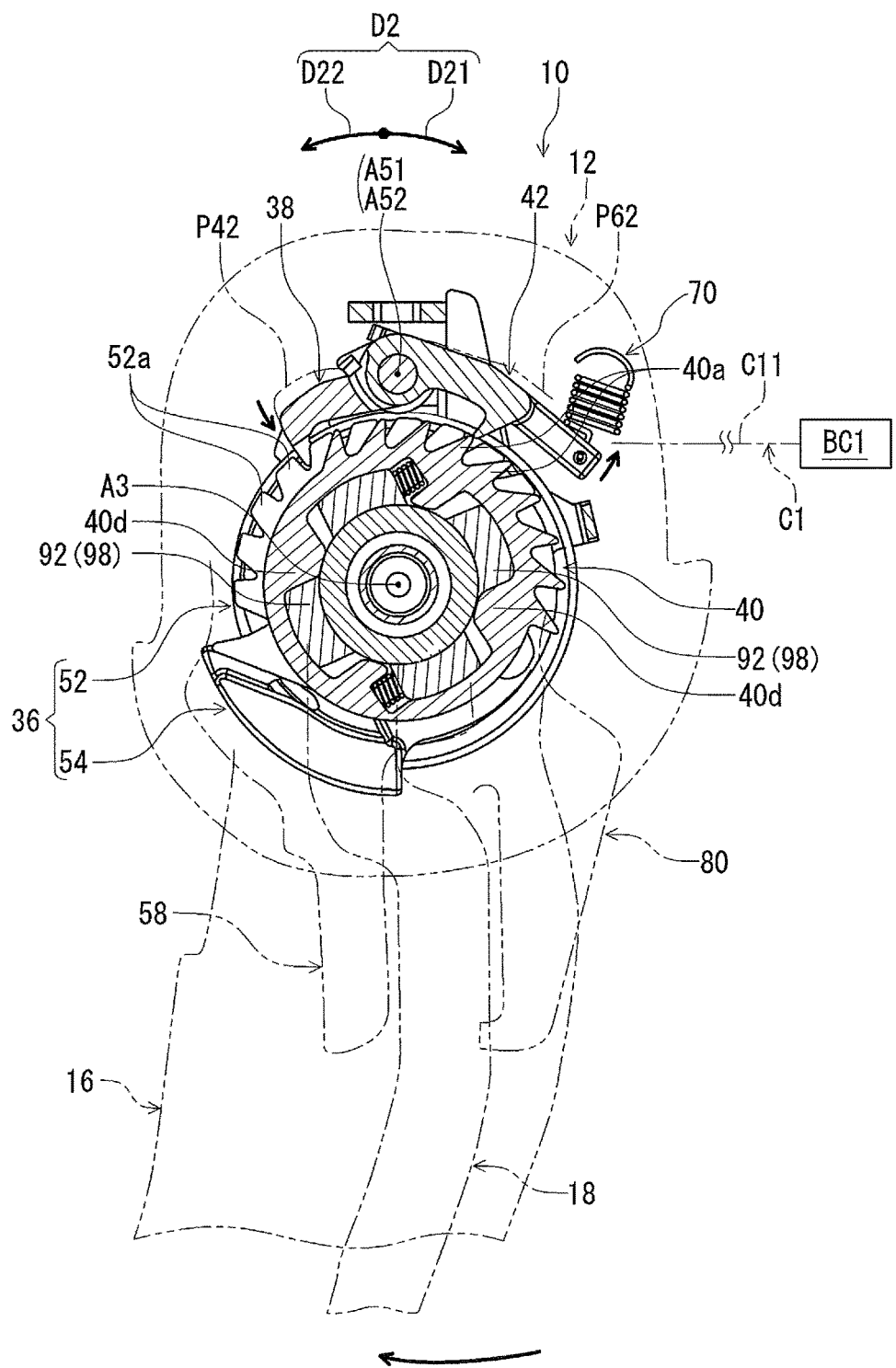
FIG. 23 is a cross-sectional view of the bicycle operating device illustrated in FIG. 1 (rest position).

As seen in FIG. 23, the cable control body 36 stops rotating relative to the stopping member 40 when the second protrusions 98 comes into contact with the first stoppers 40d of the stopping member 40. In this state, the cable control body 36 rotates relative to the base member 12 about the main axis A3 in the first direction D21 by a rotational angle substantially corresponding to the movable range R1 (FIG. 22) from an initial state illustrated in FIG. 20.

The movable range R1 (FIG. 22) is substantially equal to or smaller than the rotational angle corresponding to the pitch of the positioning teeth 52a. In this embodiment, for example, the movable range R1 is set within a range between about 50% and about 80% of the rotational angle corresponding to a pitch of the positioning teeth 52a. Thus, the inner wire C11 of the control cable C1 is released (returned) by a length L7 substantially corresponding to the movable range R1 even when the second operating member 18 is positioned at the second operated position P22. The length L7 is longer compared with a conventional bicycle operating device in which the stopping member 40 is secured to the cable control body 36. Thus, an operation is substantially completed in the bicycle component BC1 in response to this release operation of the control cable C1. For example, in a case where the bicycle component BC1 is a derailleur, a chain guide (not shown) is substantially moved from one of adjacent two shift positions to the other of the adjacent two shift positions in response to the release of the control cable C1 even when the second operating member 18 is positioned at the second operated position P22. Namely, the shifting motion of the chain guide is substantially completed in a state where the second operating member 18 is positioned at the second operated position P22. This improves a response speed of the bicycle operating device 10 compared with the conventional bicycle operating device.

The control member 74 (FIG. 19) rotates relative to the base member 12 in the first direction D21 when the second operating member 18 is returned to the second rest position P21 by the rider. This moves the stopping pawl 42 from the stopping position P61 to the non-stopping position P62 and moves the positioning pawl 38 from the non-holding position P42 to the holding position P41. The stopping pawl 42 disengages from the stopping teeth 40a after the positioning pawl 38 enters a space between adjacent two teeth of the positioning teeth 52a. The positioning pawl 38 comes into engagement with the positioning teeth 52a when the stopping pawl 42 disengages from the stopping teeth 40a. The positioning pawl 38 holds the cable control body 36 in the first direction D21 (FIG. 20).

The bicycle operating device 10 includes the following features.

(1) With the bicycle operating device 10, the stopping member 40 is coupled to the cable control body 36 such that the cable control body 36 is movable relative to the stopping member 40 within the movable range R1 while the stopping pawl 42 is arranged at the stopping position P61. This allows the cable control body 36 to approach or reach a target position by using the movable range R1 with restricting excess movement of the cable control body 36 relative to the stopping member 40. Accordingly, it is possible to improve a response speed of the bicycle operating device 10.

(2) Since the biasing member 104 is configured to bias the stopping member 40 relative to the cable control body 36 in the first direction D21, it is possible to position the stopping member 40 relative to the cable control body 36 at an end position of the movable range R1 by using a biasing force of the biasing member 104.

(3) The cable control body 36 is configured to release the control cable C1 when the cable control body 36 is moved in the first direction D21. The cable control body 36 is configured to pull the control cable C1 when the cable control body 36 is moved in the second direction D22. Accordingly, it is possible to move the control cable C1 in the first direction D21 by a length corresponding to the movable range R1 while the stopping pawl 42 is arranged at the stopping position P61. This allows the control cable C1 to approach or reach a target position by using the movable range R1 with restricting excess movement of the cable control body 36 relative to the stopping member 40.

(4) Since the stopping member 40 is mounted on the cable control body 36, it is possible to make the bicycle operating device 10 compact.

(5) Since the second pivot axis A52 coincides with the first pivot axis A51, it is possible to simplify a structure to pivotally support the positioning pawl 38 and the stopping pawl 42.

(6) The restricting structure 90 includes the protrusion 92 and the recess 94, it is possible to restrict the relative movement between the cable control body 36 and the stopping member 40 within the movable range R1 with a simple structure.

(7) The biasing member 104 is arranged between the protrusion 92 and the recess 94 so as to bias the stopping member 40 relative to the cable control body 36 in the first direction D21. Accordingly, it is possible to position the stopping member 40 relative to the cable control body 36 at an end position of the movable range R1 with the simple structure including the biasing member 104.

(8) The first operating member 16 is pivotable relative to the base member 12 about the first operating axis A11 in the first operating direction D11. The control member 74 is rotatable about the main axis A3 in the second direction D22 in response to a movement of the first operating member 16 in the first operating direction D11 such that the control member 74 moves the positioning pawl 38 from the holding position P41 toward the non-holding position P42 and moves the stopping pawl 42 from the non-stopping position P62 toward the stopping position P61. Accordingly, it is possible to move the positioning pawl 38 and the stopping pawl 42 via the first operating member 16.

(9) The second operating member 18 is pivotable relative to the base member 12 about the second operating axis A12 in the second operating direction D12. The transmitting structure 78 is configured to transmit a pivotal movement of the second operating member 18 in the second operating direction D12 to the cable control body 36 such that the cable control body 36 is rotated in the second direction D22. Accordingly, it is possible to rotate the cable control body 36 in the second direction D22 via the second operating member 18.

Second Embodiment

A bicycle operating device 210 in accordance with a second embodiment will be described below referring to FIGS. 24 and 25. The bicycle operating device 210 has the same configuration as the bicycle operating device 10 except for the stopping pawl 42 and the second biasing element 70. Thus, elements having substantially the same function as those in the first embodiment will be numbered the same here, and will not be described and/or illustrated again in detail here for the sake of brevity.

Figure 24:
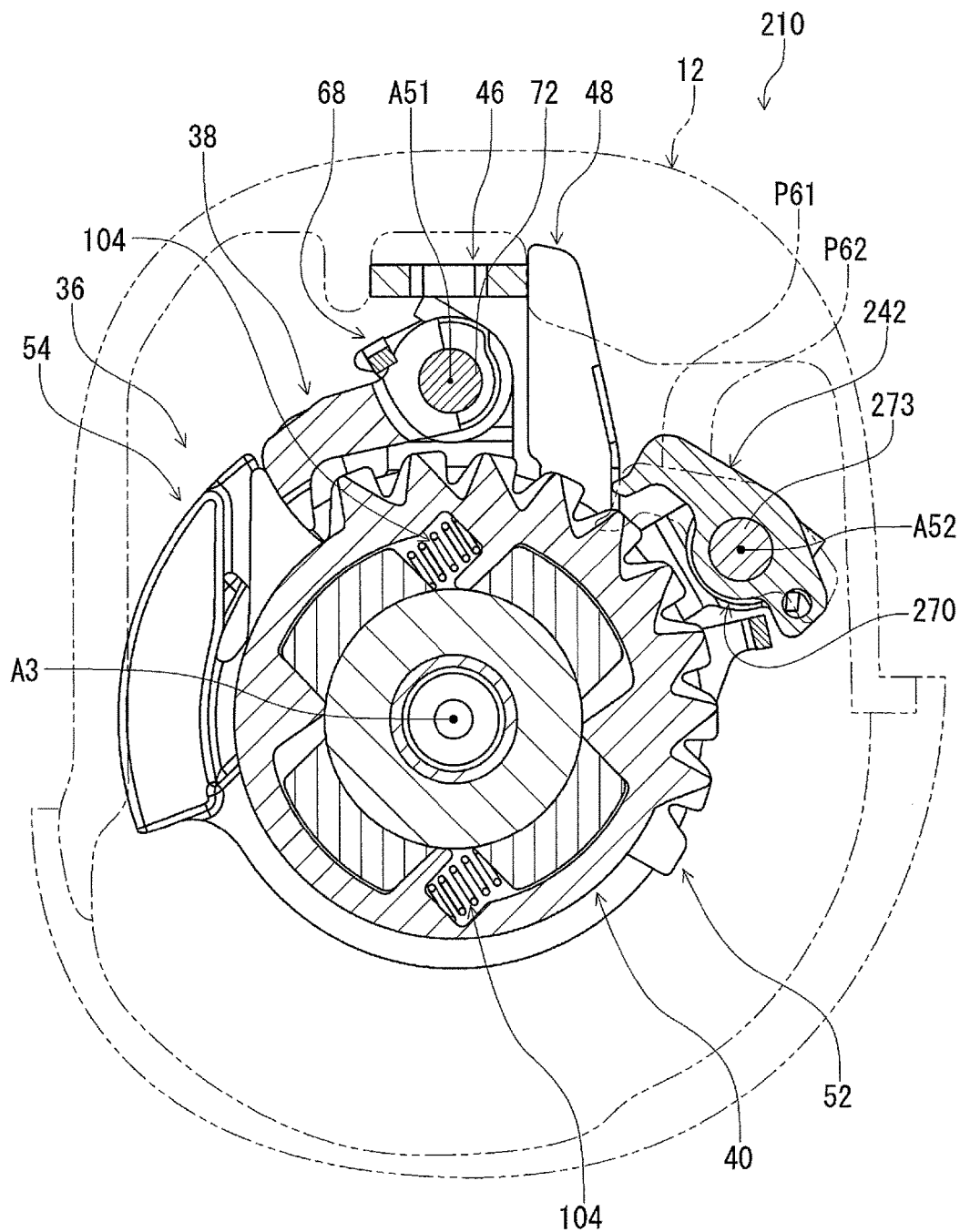
FIG. 24 is a cross-sectional view of a bicycle operating device in accordance with a second embodiment.
Figure 25:
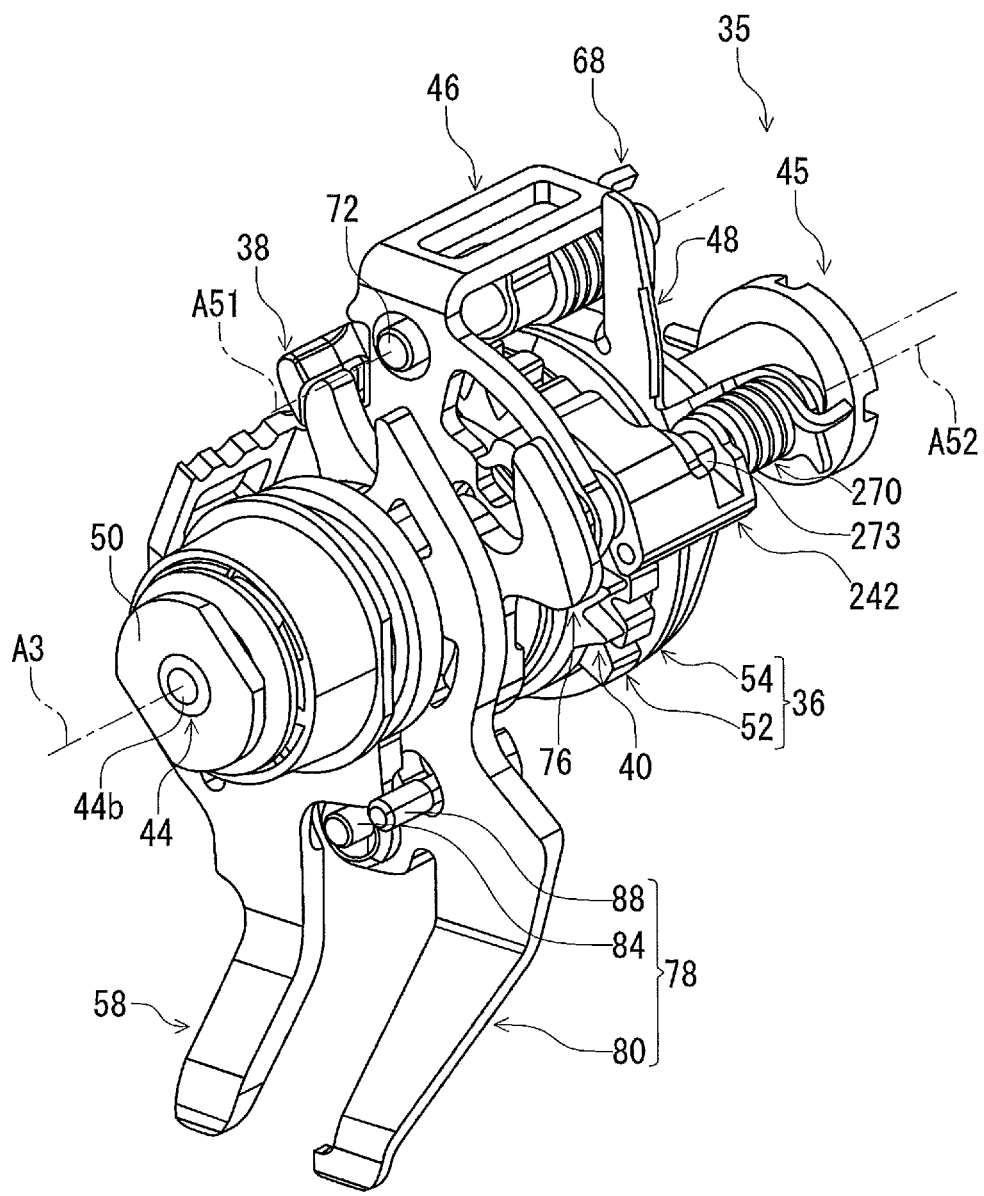
FIG. 25 is a perspective view of a shift operating unit of the bicycle operating device illustrated in FIG. 24.

As seen in FIGS. 24 and 25, the bicycle operating device 210 comprises a stopping pawl 242, a second biasing element 270, and a second pivot pin 273. The stopping pawl 242 has substantially the same structure as that of the stopping pawl 42 in the first embodiment. Unlike the stopping pawl 42, however, the second pivot axis A52 is spaced apart from the first pivot axis A51. Specifically, the second pivot pin 273 pivotally supports the stopping pawl 242. The second pivot pin 273 is mounted to the first base plate 46 and the second base plate 48. The first biasing element 68 is mounted on the second pivot pin 273. The second pivot pin 273 defines the second pivot axis A52 and is spaced apart from the first pivot pin 72.

As seen in FIG. 24, the second biasing element 270 is configured to bias the stopping pawl 242 toward the non-stopping position P62. The second biasing element 270 is configured to position the stopping pawl 242 at the non-stopping position P62. In this embodiment, the second biasing element 70 is a torsion spring. However, the second biasing element 270 can be other biasing elements.

With the bicycle operating device 210, it is possible to obtain substantially the same effects as those of the bicycle operating device 10 in accordance with the first embodiment.

Furthermore, since the second pivot axis A52 is spaced apart from the first pivot axis A51, it is possible to arrange the first pivot axis A51 and the second pivot axis A52 at different positions, improving degree of freedom of designing the bicycle operating device 210.

It will be apparent to those skilled in the bicycle field from the present disclosure that the structures of the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base member;
   a cable control body movable relative to the base member in a first direction and a second direction that is different from the first direction, the cable control body including a positioning part;
   a positioning pawl configured to engage with the positioning part, the positioning pawl movable between a holding position to stop a movement of the cable control body in the first direction, and a non-holding position to allow a movement of the cable control body in the first direction;
   a ratchet gear movable relative to the base member, the cable control body, and the positioning part in the first direction and the second direction;
   a stopping pawl configured to engage with the ratchet gear, the stopping pawl movable between a stopping position to stop a movement of the ratchet gear in the first direction, and a non-stopping position to allow a movement of the ratchet gear in the first direction, the ratchet gear being coupled to the cable control body such that the cable control body is movable relative to the ratchet gear within a movable range while the stopping pawl is arranged at the stopping position;
   a biasing member arranged between the ratchet gear and the cable control body to bias the ratchet gear relative to the cable control body in the first direction;
   a protrusion provided at one of the cable control body and the ratchet gear; and a recess provided at the other of the cable control body and the ratchet gear, the protrusion being disposed and restricted to movement within the recess, the recess being dimensioned such that the protrusion is movable within the movable range in the first direction and the second direction.

2. The bicycle operating device according to claim 1, wherein
the second direction is opposite to the first direction,
the cable control body includes a cable attachment part to which a control cable is attached,
the cable control body is configured to release the control cable when the cable control body is moved in the first direction, and
the cable control body is configured to pull the control cable when the cable control body is moved in the second direction.

3. The bicycle operating device according to claim 1, wherein
the cable control body is rotatable relative to the base member about a main axis.

4. The bicycle operating device according to claim 3, wherein
the positioning part includes positioning teeth configured to engage with the positioning pawl.

5. The bicycle operating device according to claim 4, wherein
the positioning part has an outer periphery, and
the positioning teeth are provided on the outer periphery of the positioning part.

6. The bicycle operating device according to claim 3, wherein
the ratchet gear is rotatable relative to the cable control body about the main axis within the movable range.

7. The bicycle operating device according to claim 6, wherein
the ratchet gear is mounted on the cable control body.

8. The bicycle operating device according to claim 6, further comprising:
a first operating member pivotable relative to the base member about a first operating axis in a first operating direction; and
a control member rotatable about the main axis in the second direction in response to a movement of the first operating member in the first operating direction such that the control member moves the positioning pawl from the holding position toward the non-holding position and moves the stopping pawl from the non-stopping position toward the stopping position.

9. The bicycle operating device according to claim 8, further comprising:
a second operating member pivotable relative to the base member about a second operating axis in a second operating direction; and
a transmitting structure configured to transmit a pivotal movement of the second operating member in the second operating direction to the cable control body such that the cable control body is rotated in the second direction.

10. The bicycle operating device according to claim 6, wherein
the ratchet gear includes stopping teeth configured to engage with the stopping pawl.

11. The bicycle operating device according to claim 10, wherein
the ratchet gear has an outer periphery, and
the stopping teeth are provided on the outer periphery of the ratchet gear.

12. The bicycle operating device according to claim 1, wherein
the positioning pawl is pivotable relative to the base member about a first pivot axis between the holding position and the non-holding position, and
the stopping pawl is pivotable relative to the base member about a second pivot axis between the stopping position and the non-stopping position.

13. The bicycle operating device according to claim 12, wherein
the second pivot axis is spaced apart from the first pivot axis.

14. The bicycle operating device according to claim 1, wherein
the ratchet gear is movably mounted on the cable control body within the movable range.

15. The bicycle operating device according to claim 1, wherein
the biasing member is arranged between the protrusion and the recess so as to bias the ratchet gear relative to the cable control body in the first direction.

16. The bicycle operating device according to claim 1, wherein
the cable control body includes a pulling part.

17. The bicycle operating device according to claim 1, wherein
the ratchet gear is separate from the positioning part.

18. The bicycle operating device according to claim 1, wherein
the ratchet gear includes an annular portion and stoppers configured to restrict movement of the cable control part within the movable range.

19. The bicycle operating device according to claim 1, wherein
a protrusion provided at one of the cable control body and the ratchet gear, and
a recess provided at the other of the cable control body and the ratchet gear, the recess being dimensioned such that the protrusion is movable within the movable range in the first direction and the second direction.

20. The bicycle operating device according to claim 1, wherein
the biasing member is a spring member configured to bias the ratchet gear relative to the cable control body in the first direction.

21. The bicycle operating device according to claim 1, wherein
the biasing member is a spring member arranged between the protrusion and the recess so as to bias the ratchet gear relative to the cable control body in the first direction.

22. A bicycle operating device comprising:
a base member;
a cable control body movable relative to the base member in a first direction and a second direction that is different from the first direction, the cable control body including a positioning part;
a positioning pawl configured to directly engage with the positioning part, the positioning pawl movable between a holding position to stop a movement of the cable control body in the first direction, and a non-holding position to allow a movement of the cable control body in the first direction;

a ratchet gear movable relative to the base member, the cable control body, and the positioning part in the first direction and the second direction;

a stopping pawl configured to engage with the ratchet gear, the stopping pawl movable between a stopping position to stop a movement of the ratchet gear in the first direction, and a non-stopping position to allow a movement of the ratchet gear in the first direction, the ratchet gear being coupled to the cable control body such that the cable control body is movable relative to the ratchet gear within a movable range while the stopping pawl is arranged at the stopping position;

a protrusion provided at one of the cable control body and the ratchet gear; and a recess provided at the other of the cable control body and the ratchet gear, the protrusion being disposed and restricted to movement within the recess, the recess being dimensioned such that the protrusion is movable within the movable range in the first direction and the second direction, wherein the positioning pawl is pivotable relative to the base member about a first pivot axis between the holding position and the non-holding position, the stopping pawl is pivotable relative to the base member about a second pivot axis between the stopping position and the non-stopping position, and the second pivot axis coincides with the first pivot axis.

23. A bicycle operating device comprising:

a base member;

a cable control body movable relative to the base member in a first direction and a second direction that is different from the first direction, the cable control body including a positioning part;

a positioning pawl configured to engage with the positioning part, the positioning pawl movable between a holding position to stop a movement of the cable control body in the first direction, and a non-holding position to allow a movement of the cable control body in the first direction;

a stopping member movable relative to the base member, the cable control body, and the positioning part in the first direction and the second direction; and a stopping pawl configured to engage with the stopping member, the stopping pawl movable between a stopping position to stop a movement of the stopping member in the first direction, and a non-stopping position to allow a movement of the stopping member in the first direction, wherein a protrusion is provided on one of the cable control body and the stopping member, a recess is provided on the other of the cable control body and the stopping member, the protrusion being disposed within the recess, the recess being dimensioned such that the protrusion is restricted to movement within a movable range in the first direction and the second direction and such that the cable control body is movable relative to the stopping member within the movable range while the stopping pawl is arranged at the stopping position, and further comprising a biasing member arranged between the protrusion and the recess so as to bias the stopping member relative to the cable control body in the first direction.

24. A bicycle operating device comprising:

a base member;

a cable control body movable relative to the base member in a first direction and a second direction that is different from the first direction, the cable control body including a positioning part;

a positioning pawl configured to engage with the positioning part, the positioning pawl movable between a holding position to stop a movement of the cable control body in the first direction, and a non-holding position to allow a movement of the cable control body in the first direction;

a ratchet gear movable relative to the base member, the cable control body, and the positioning part in the first direction and the second direction;

a stopping pawl configured to engage with the ratchet gear, the stopping pawl movable between a stopping position to stop a movement of the ratchet gear in the first direction, and a non-stopping position to allow a movement of the ratchet gear in the first direction;

restricting means for restricting relative movement between the cable control body and the ratchet gear within a movable range while the stopping pawl is arranged at the stopping position; and a biasing member arranged between the ratchet gear and the cable control body to bias the ratchet gear relative to the cable control body in the first direction.

* * * * *